United States Patent [19]

McWilliams et al.

[11] Patent Number: 5,289,993
[45] Date of Patent: Mar. 1, 1994

[54] METHOD AND APPARATUS FOR TRACKING AN AIMPOINT WITH ARBITRARY SUBIMAGES

[76] Inventors: Joel K. McWilliams, 2525 Rosedale, Highland Village; Don R. Van Rheeden, 357 E. Corporate Dr., #1824, Lewisville, both of Tex. 75067

[21] Appl. No.: 954,643

[22] Filed: Sep. 30, 1992

Related U.S. Application Data

[60] Continuation-in-part of Ser. No. 793,151, Aug. 30, 1991, Pat. No. 5,213,281, Division of Ser. No. 753,294, Aug. 30, 1991, Pat. No. 5,211,356.

[51] Int. Cl.$^5$ .............................................. F41G 7/30
[52] U.S. Cl. ................................................ 244/3.15
[58] Field of Search .................. 244/3.15, 3.16, 3.17; 382/1, 48

[56] References Cited

U.S. PATENT DOCUMENTS

| | | | |
|---|---|---|---|
| 3,912,198 | 10/1975 | Dell et al. | 244/3.16 |
| 4,133,004 | 1/1979 | Fitts | 244/3.16 |
| 4,476,494 | 10/1984 | Tugayé | 244/3.17 |
| 4,868,871 | 9/1989 | Watson, III | 382/1 |
| 5,211,356 | 5/1953 | McWilliams et al. | 244/3.15 |
| 5,213,281 | 5/1993 | McWilliams et al. | 244/3.15 |

OTHER PUBLICATIONS

Collection of presentation materials prepared by the Applicants on Jun. 26, 1991 for presentation to the U.S. Army technical staff.
A computer printout of the results of a patent search conducted Aug. 20, 1991 by Texas Instruments' library personnel.
Blackman, Samuel, *Multiple-Target Tracking with Radar Applications*, Artech House, Inc., 1986, pp. 309–328.
Huber, Peter, *Robust Statistics*, John Wiley & Sons, Inc., 1981, pp. 107–108.
Liu, Zhili, "New Image Tracking Algorithm for Fuzzy-Relaxation Matching of Point Patterns", *Hongwai Yanjiu, vol. 8, No. 5, 1978, pp. 349–354* (translated into English by the Foreign Technology Division of defense Technical Information Center, Defense Logistics Agency).

*Primary Examiner*—Ian J. Lobo

[57] ABSTRACT

A method for tracking an aimpoint with arbitrary subimages as described. The method comprises the steps of acquiring an aimpoint (50) on a target and a set of subimages (80) arbitrarily associated with the aimpoint by a sensor in a field of view. For a first time, the dimensionality of each subimage (82) and a normalized distance (54) from each subimage to the aimpoint are determined. For a second time, at least one of the subimages is reacquired (56) and the subsequent location of the aimpoint is estimated (58) based on the subsequent location of the subimages, on the normalized distances, and, where a subimage is one-dimensional, on a maximum eigenvector associated with the subimage.

18 Claims, 7 Drawing Sheets

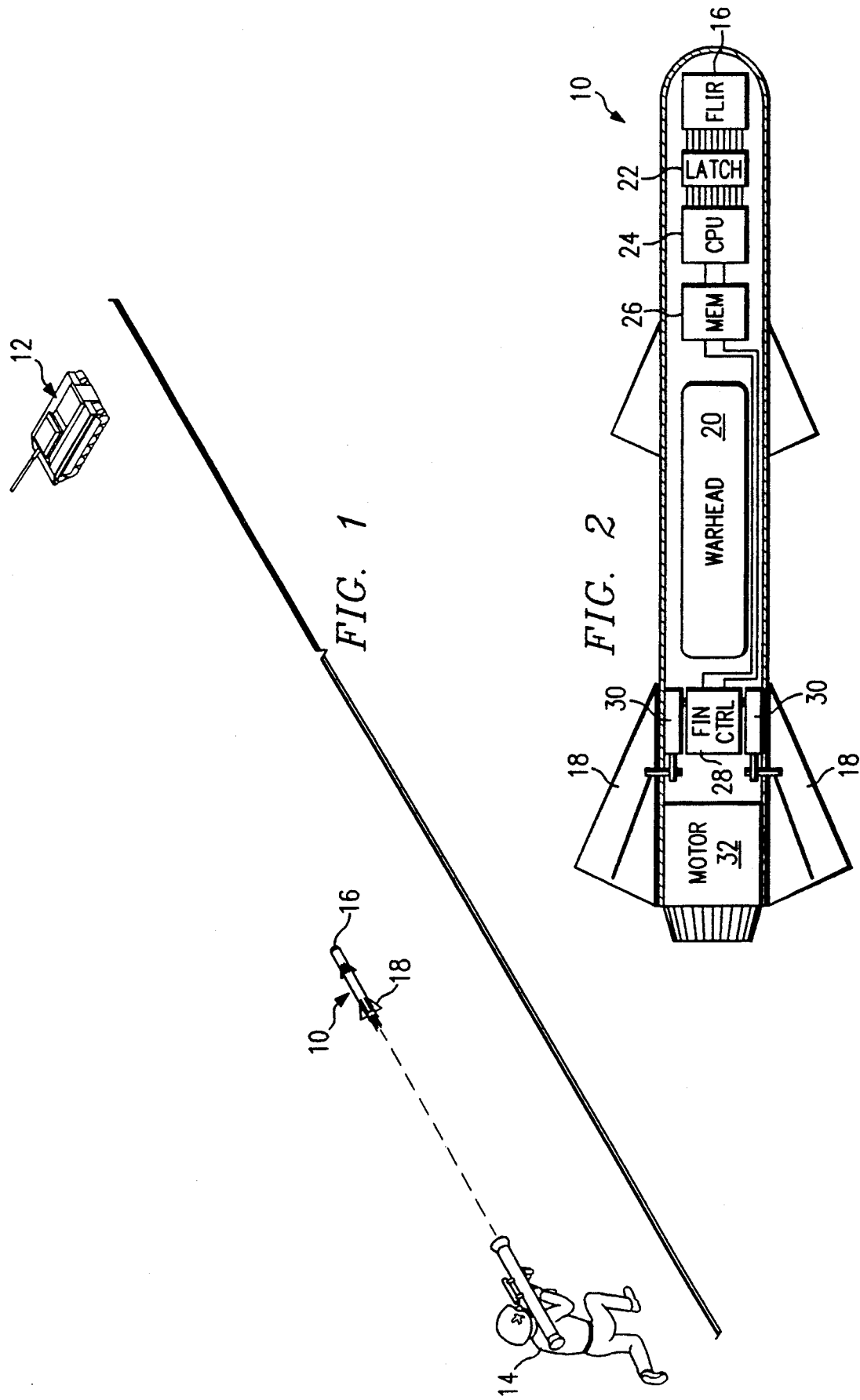

$$[G]^T = \begin{bmatrix} .000968620 & .00000 & .039761730 \\ .015449444 & -.020000000 & .015449444 \\ -.005763266 & -.010000000 & .007167770 \\ -.012834169 & .00000 & .004407212 \\ -.005763266 & .010000000 & .007167770 \\ .015449444 & .020000000 & .015449444 \\ .007167770 & -.010000000 & -.005763266 \\ -.014044940 & -.005000000 & -.014044940 \\ -.021115843 & .00000 & -.016805498 \\ -.014044940 & .005000000 & -.014044940 \\ .007167770 & .010000000 & -.005763266 \\ .039761730 & .00000 & .000968620 \\ .004407212 & .00000 & -.012834169 \\ -.016805498 & .00000 & -.021115843 \\ -.016805498 & .00000 & -.021115843 \\ .004407212 & .00000 & -.012834169 \\ .039761730 & .00000 & .000968620 \\ .007167770 & .010000000 & -.005763277 \\ -.014044940 & .005000000 & -.014044940 \\ -.021115843 & .00000 & -.016805498 \\ -.014044940 & -.005000000 & -.014044940 \\ .007167770 & -.010000000 & -.005763266 \\ .015449444 & .020000000 & .015449444 \\ -.005763266 & .010000000 & .007167770 \\ -.012834169 & .00000 & .004407212 \\ -.005763266 & -.010000000 & .007167770 \\ .015449444 & -.020000000 & .015449444 \\ .000968620 & .00000 & .039761730 \end{bmatrix}$$

METHOD AND APPARATUS FOR TRACKING AN AIMPOINT WITH ARBITRARY SUBIMAGES

RELATED APPLICATIONS

This application is a continuation-in-part of U.S. patent application Ser. No. 753,151, now U.S. Pat. No. 5,213,281, filed Aug. 30, 1991, entitled "Method and Apparatus for Tracking an Aimpoint with Arbitrary Subimages".

This application is also a continuation-in-part of U.S. patent application Ser. No. 753,294, now U.S. Pat. No. 5,211,356, filed Aug. 30, 1991, entitled "Method and Apparatus for Rejecting Trackable Subimages".

TECHNICAL FIELD OF THE INVENTION

This invention relates to computer control and more particularly to a method of tracking an aimpoint with arbitrary subimages.

BACKGROUND OF THE INVENTION

In certain computer control applications, it is necessary to track and measure the image of an object passively. It is especially important in weapons delivery systems that a target be so tracked. If such a target were tracked actively (i.e., using radar or laser range finding techniques), the target might detect the presence of the tracker. Once the target has detected the presence of the tracker, it can respond in one of several ways, all of which are deleterious to the tracker. For instance, the target might "jam" the tracker by bombarding it with signals that are comparable to those which the tracker is actively using or the target might fire its own weapon at the tracker, at the source of the tracking signal, or, even at the launching site of the tracker. In this way, the target could defeat the tracker, destroy the tracker or perhaps even destroy the launch site of the tracker, including the operating personnel.

Passively tracking a target, however, imposes at least one serious limitation on the tracker. A tracker cannot accurately determine the distance or "range" to a target if it cannot actively sense the object. An active tracker, for instance, could determine the distance to a target by measuring the elapsed time from the emission of a radio frequency signal to the receipt of the signal reflected off of the target. The absence of a range measurement from tracker to target limits the passive tracker's ability to compensate for the apparent change in target image as the tracker moves in relationship to the target. Without this ability, a tracker will fail to maintain a constant target aimpoint.

In practice, a tracker benefits by tracking several subimages of its target's image. These subimages are two dimensional representations of structures that are physically related to the exact target location or "aimpoint" in the real three-dimensional world. Multiple subimages are used for redundancy purposes and because the actual aimpoint of the target is often untrackable due to low image contrast, brightness, or other reasons. As the tracker nears the target, however, the subimages will appear to radiate outwardly with respect to each other. The position of the subimages with respect to one another may also change in other ways in certain situations. For instance, two subimages located on a target may appear to approach one another if they are located on a face of a target that is rotating away from the tracker. A subimage associated with a straight edged structure or a line poses other problems for a passive tracker. Such a subimage is indistinguishable from other subimages corresponding to other points on the line. This ambiguity can introduce serious error into a track. Straight edges typically appear when tracking structures such as buildings, bridges, dams or internal detail on armored vehicles. The tracker motion can be further complicated by background subimages erroneously tracked by the tracker. A tracker will then mislocate the aimpoint and, perhaps, completely miss its target if it cannot identify and compensate for "bad" subimages.

Prior attempts to passively track an object have resulted in solutions with limited flexibility and poor accuracy. Heretofore, an object once identified as an aimpoint was tracked by tracking a predetermined number of subimages in a known pattern. Typically, the pattern chosen was a square with the aimpoint at its center and four subimages located at the four corners of the square. That system would track the four subimages located at the corners of the square and infer the actual aimpoint using the simple symmetry of the predetermined square. This method faltered when the geometry of the actual target resulted in less than four suitable subimages located in the requisite pattern or when the subimage selected was not associated with the aimpoint. This system lacked the ability to identify bad subimages.

Therefore, a need has arisen for a passive subimage tracker which is able to identify trackable subimages in arbitrary image locations and use them to track an aimpoint.

SUMMARY OF THE INVENTION

In accordance with the present invention, a method and apparatus for tracking an aimpoint with arbitrary subimages is provided which substantially eliminates or reduces disadvantages and problems associated with prior trackers.

A method for tracking an aimpoint with arbitrary subimages is described. The method comprises the steps of acquiring an aimpoint on a target and a set of subimages arbitrarily associated with the aimpoint by a sensor in a field of view. For a first time, the dimensionality of each subimage and a normalized distance from each subimage to the aimpoint are determined. For a second time, at least one of the subimages is reacquired and the subsequent location of the aimpoint is estimated based on the subsequent location of the subimages and on the normalized distances. Where a subimage is determined to be one-dimensional, a maximum eigenvector is calculated for the subimage and the component of the normalized distance parallel to the eigenvector is used.

It is a first technical advantage of the invention that the aimpoint tracker can detect and use subimages associated with lines as well as two-dimensionally distinct subimages. This improves accuracy twice. First, each subimage is modeled with the appropriate (one- or two-dimensional) mathematical model. Second, more subimages are available to track an aimpoint. Each consequence advantageously affects tracker accuracy.

A second technical advantage of the invention is the tracker's ability to reject subimages which yield poor results. Typically, these subimages yield such results because they represent image clutter which is not physically associated with the target. This improves the future confidence of aimpoint calculations.

A third technical advantage of the invention is its enhanced ability to redetermine the aimpoint based on an adjusted set of subimages. The adjusted set of subimages includes only those subimages which behave as though they are connected to the aimpoint in the real world. This improves the immediate confidence of aimpoint calculations and the accuracy of the device, such as a missile, whose movement path is charted based on the perceived aimpoint.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a perspective schematic view of the use of an anti-armor "fire and forget" missile system which may advantageously incorporate the disclosed invention;

FIG. 2 is a schematic, part cross-sectional diagram of the anti-armor missile of FIG. 1;

DETAILED DESCRIPTION OF THE INVENTION

Figure 3:
FIG. 3 is a half-tone replication of a digitized image of the target at a certain time as seen by the "fire and forget" missile depicted in FIG. 1.

The preferred embodiment of the present invention and its advantages are best understood by referring to FIGS. 1-18 of the drawings, like numerals being used for like and corresponding parts of the various drawings.

FIG. 1 depicts an anti-armor "fire and forget" missile system which incorporates the disclosed invention. A missile 10 is fired at a target 12 by an infantryman 14. Infantryman 14 selects an aimpoint on the target 12 that he believes will offer the least resistance to missile 10 upon impact. Missile 10 incorporates a passive imaging sensor 16 and a processor (not shown) for acquiring and digitizing an image. Missile 10 also has movable fins 18 which are controlled by the processor to vary the direction of the missile. Missile 10 acquires trackable subimages related to the particular aimpoint selected by infantryman 14 which are within the field of view of the sensor 16. Missile 10 computes an initial geometric relationship between the aimpoint and the initial subimages and retains this in an onboard memory (not shown). Missile 10 periodically reacquires the subimages and computes a new aimpoint as will be more fully described below. Missile 10 may then adjust its path to intercept target 12 despite subsequent movement of the target 12 relative to infantryman 14 or missile 10.

The type of missile depicted in FIG. 1 is known as a "fire and forget" missile because infantryman 14 may forget the missile after launch and seek cover or engage other targets of opportunity. Missile 10, however, will continue to track and intercept target 12. Missile 10 may select subimages based on any number of criteria including, but not limited to, the "hot spot" and "correlator" methods. In the "hot spot" method, a sensor identifies subimages according to the hottest (brightest or warmest) spot within a specified region. In the correlator method, the tracker searches for a previously identified subimage.

FIG. 2 depicts "fire and forget" missile 10 which may incorporate the disclosed invention. Missile 10 delivers a warhead 20 which detonates upon impact with target 12 (FIG. 1). The missile 10 contains an onboard sensor 16 such as a forward looking infrared sensor ("FLIR"), that is sensitive to radiation emitted by the missile's target. A latch 22 temporarily saves the information received by sensor 16 so that it is more accessible by a central processing unit ("CPU") 24. CPU 24 might itself comprise various subsystems (not shown) which may be implemented by hardware or software, including an aimpoint designator for initially establishing the aimpoint on the target, a normalized distance calculator for calculating the distance between each subimage and the aimpoint, and a comparator for comparing the actual and estimated subimage locations and for rejecting those subimages that fail a certain statistical test.

CPU 24 periodically acquires images within its field of view during the operation of missile 10. CPU 24 has associated with it a memory 26. Memory 26 contains the routines which CPU 24 runs and stores data necessary to the disclosed invention. CPU 24 controls the direction of missile 10 through a fin control unit 28. Fin control unit 28 manipulates each fin 18 through, for example, a servo 30. Missile 10 is propelled by a rocket motor 32.

FIG. 3 depicts a view of target 12 by sensor 16 of missile 10. The aimpoint, as originally specified by infantryman 14, is indicated by a crosshairs. In this particular embodiment, missile 10 has an infrared sensor. The engine compartment and wheel bearings of target 12, being hottest, are therefore indicated by the color white. Cooler structures such as the background are indicated by shades of grey and by black.

Figure 4:
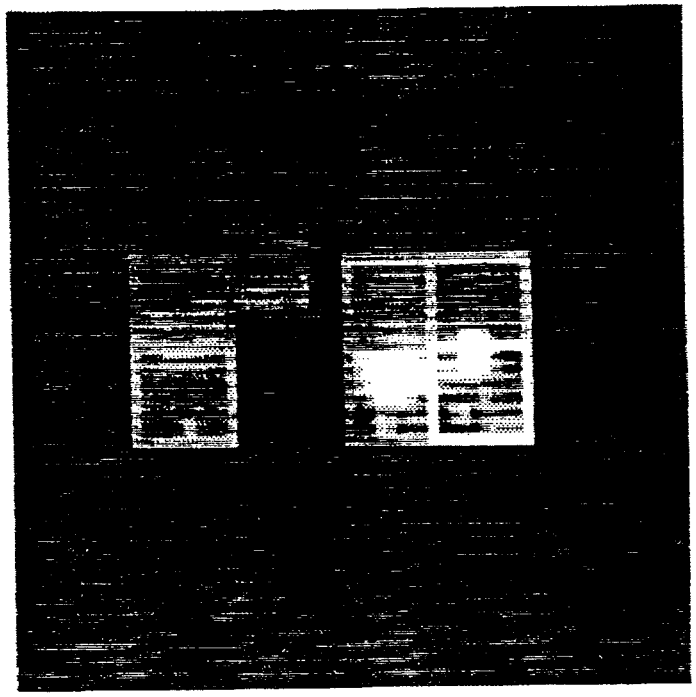
FIG. 4 depicts trackable subimages associated with the target depicted in FIG. 1 at the time corresponding to the time of FIG. 3.

FIG. 4 depicts certain trackable subimages contained in FIG. 3. Each trackable subimage is identified as a small square. A tracker on board missile 10 initially selects a number of these subimages to track the target at an initial time. The tracker also calculates a normalized distance between the aimpoint selected by the infantryman 14 and each subimage. This distance may be the actual number of pixels between the aimpoint and the subimage as sensed by the tracker. The distance may be further normalized so that at least one subimage is a certain distance, such as "1", away from the aimpoint. These dimensions are saved for future use by the tracker.

Figure 5:
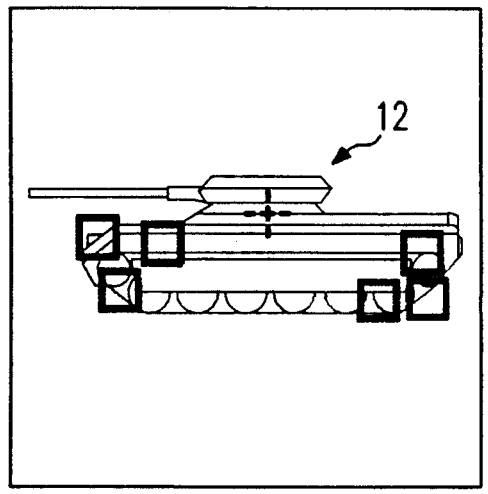
FIGS. 5 and 6 are schematic elevational views depicting the image and trackable subimages of the target from FIG. 1 at a first time and at a subsequent time, respectively.
Figure 6:
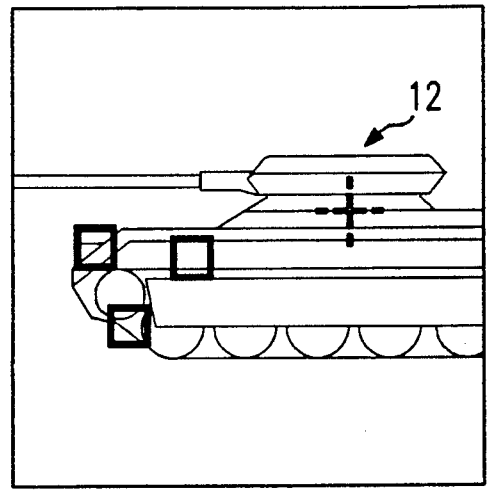

FIG. 5 depicts a view of target 12 and six trackable subimages superimposed thereon. FIG. 6 depicts the view of target 12 and the trackable subimages as depicted in FIG. 5 at a slightly later time. The image of target 12 appears to grow in size as the missile 10 (FIGS. 1 and 2) closes in on target 12. As a consequence, the subimages depicted also appear to grow in size and to move radially outward from the aimpoint. Three subimages, initially at the right side of FIG. 5, are no longer visible in the field of view. The tracker will typically adjust its course to maintain the aimpoint (crosshairs) in the center of its field of view. This apparent movement of the subimages relative to the aimpoint and the loss of some subimages must be accounted for by the tracker to insure successful guidance of missile 10 to target 12.

GENERALIZED GEOMETRIC MODEL

The approach to multiple subimage tracking without range estimates is based on a generalized geometric model. This model is based on the fact that though the target and thus the subimages will be growing in the image during closure to the target, the relative dimensions of the target do not change. This assumes that the angle of attack between the tracker and target stays fairly constant, which is common during most of the terminal phase of the missile flight.

In the generalized geometric approach each tracker location is related to the aimpoint location using a normalized coordinate frame. An individual subimage i at image location ($x_i$, $y_i$) can be related to the aimpoint A at image location ($x_A$, $y_A$) by the following equations:

$$x_i = x_A + \delta x_i + n_{xi} \quad (1)$$

$$y_i = y_A + \delta y_i + n_{yi} \quad (2)$$

where ($\delta x_i$, $\delta y_i$) represents the offset in the image plane of subimage i from the aimpoint A, and ($n_{xi}$, $n_{yi}$) are additive noise terms which corrupt measurement of the true subimage location. These equations can be combined into a single equation using vector notation:

$$\underline{x} = \underline{x}_A + \underline{\delta x} + \underline{n} \quad (3)$$

The key to accurately modeling each subimage position is the accurate representation of the offset vector. The offset vector may be expressed as:

$$\begin{bmatrix} \delta x_i \\ \delta y_i \end{bmatrix} = \begin{bmatrix} s d_{xi} \\ s d_{yi} \end{bmatrix} \quad (4)$$

where s is the target image magnification factor ("TIMF") and ($d_{xi}$, $d_{yi}$) are the size normalized distances between a subimage i and the aimpoint A. Thus ($d_{xi}$, $d_{yi}$) are range independent normalized distances.

Although size is typically chosen as the normalization factor because it is a measurable quantity of the target, any scaling factor can be used. This model leads to the following matrix representation for a subimage i:

$$\begin{bmatrix} x_i \\ y_i \end{bmatrix} = \begin{bmatrix} 1 & 0 & d_{xi} \\ 0 & 1 & d_{yi} \end{bmatrix} \begin{bmatrix} x_A \\ y_A \\ s \end{bmatrix} + \begin{bmatrix} n_{xi} \\ n_{yi} \end{bmatrix} \quad (5)$$

For N subimages, the previous equation may be expanded:

$$\begin{bmatrix} x_1 \\ \vdots \\ x_N \\ y_1 \\ \vdots \\ y_n \end{bmatrix} = \begin{bmatrix} 1 & 0 & d_{x1} \\ \vdots & \vdots & \vdots \\ 1 & 0 & d_{xN} \\ 0 & 1 & d_{y1} \\ \vdots & \vdots & \vdots \\ 0 & 1 & d_{yN} \end{bmatrix} \begin{bmatrix} x_A \\ y_A \\ s \end{bmatrix} + \begin{bmatrix} n_{x1} \\ \vdots \\ n_{xN} \\ n_{y1} \\ \vdots \\ n_{yN} \end{bmatrix} \quad (6)$$

Equation (6) may be rewritten as $$\underline{x} = H\theta + \underline{n} \quad (7)$$

where $$\theta = [x_A y_A s]^T, \quad (8)$$

$\underline{x}$ is a vector of subimage locations and H is the $2N \times 3$ matrix of "1"s, "0"s, and normalized distances depicted in Eq. (6) above. At each successive time at which the tracker reacquires the subimages, all variables are known except those in $\theta$ and in the noise vector $\underline{n}$.

The vector $\theta$ and hence the aimpoint may be estimated by several techniques including a least squares technique where:

$$\hat{\theta} = (H^T H)^{-1} H^T \underline{x} \quad (9)$$

where $\hat{\theta}$ is an estimate of $\theta$. This method will minimize the effect of the noise vector $\underline{n}$.

Figure 7:
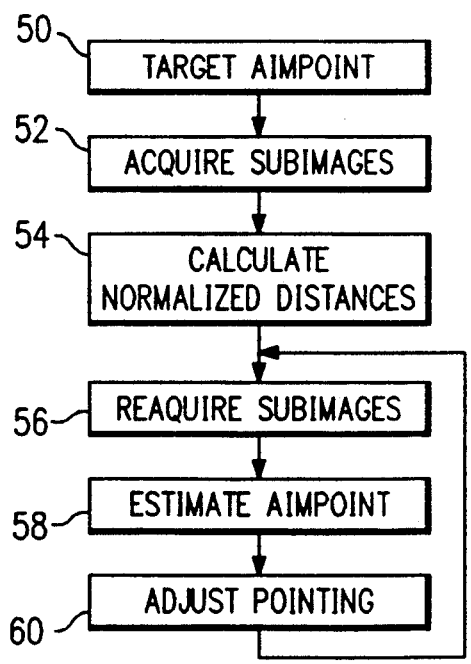
FIG. 7 depicts a flow chart of a subimage tracker according to one embodiment of the disclosed invention.

FIG. 7 depicts a flow chart of a subimage tracker that incorporates the generalized geometric approach. An aimpoint is initially acquired on the target in block 50 by an operator. The tracker then acquires multiple subimages associated with the chosen aimpoint according to internal criteria such as image contrast or image brightness in block 52. The tracker calculates the normalized distances between each subimage that it has acquired and the selected aimpoint in block 54. These distances are stored in a matrix whose particular form is shown in Eq. (6) above. In blocks 56 and 58, the tracker reacquires the subimages and estimates the location of the aimpoint from the previously calculated normalized distances using a mathematical model such as Eq. (9) described above.

If the missile is closing on the target, some of the original subimages may leave the field of view of the sensor. Meanwhile, new trackable subimages may be found as target details appear. These new subimage locations may be added to the matrix of subimage locations, typically in block 56, as needed. The tracker may then adjust sensor pointing, block 60, to maintain the aimpoint at the center of its field of view. The final three steps depicted in FIG. 7 are repeated until the missile impacts its target or the tracker otherwise ends its program. It should be understood that block 60 may comprise any number of related steps such as issuing commands to an operator to follow the aimpoint or displaying crosshairs to pinpoint the location of the aimpoint in a display. The tracker may also be mounted in a stationary environment where it simply follows an aimpoint in its field of view without actively pursuing the target.

GENERALIZED ERROR CHECKING ROUTINE

Figure 8:
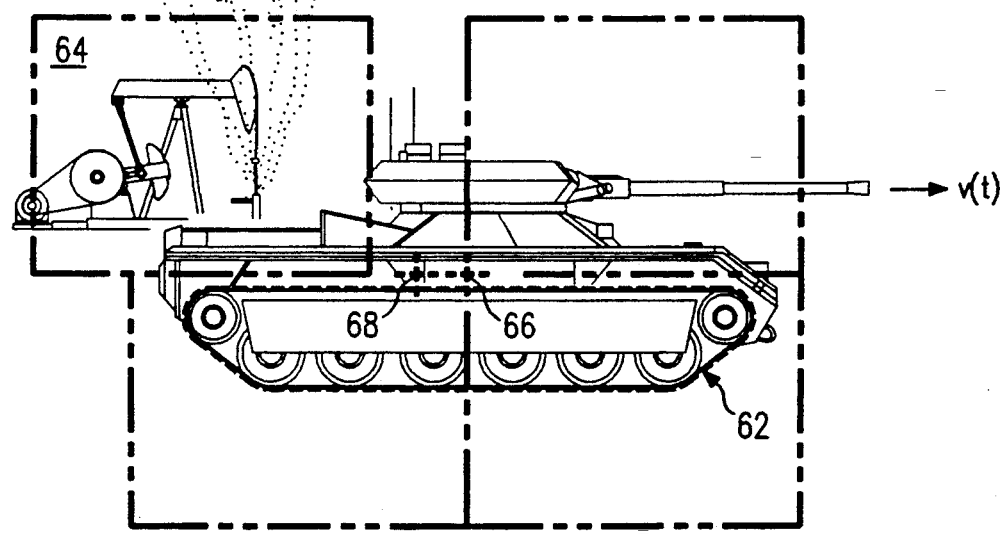
FIG. 8 depicts a target being tracked by four subimages where one subimage does not move with the aimpoint.

FIG. 8 is an elevational view of a targeted tank in which the tank 62 is moving from left to right with a velocity v(t). A trackable clutter object 64 in the upper left correlator (indicated by the burning oil well pump) will introduce a bias into the original aimpoint 66. If the clutter happens to be more trackable than the upper left edges of the tank, the aimpoint will slide toward the back of the tank (indicated by the cross 68). As the aimpoint slides, a higher percentage of clutter will be incorporated into future correlation reference snapshots, to the exclusion of subimages of the target. Eventually, the aimpoint may be off the target altogether. The rate of sliding is a function of target velocity, the amount of clutter in any one tracker subimage, and the infrared ("IR") strength of the clutter relative to the target if the tracker is IR sensitive. The same scenario will occur if, instead of using four correlator groups as depicted, any number of arbitrary subimages were employed.

The reason why the aimpoint can slide in scenarios like FIG. 8 is that the aimpoint is computed by assuming that all the individual subimages have the same magnification around the aimpoint. If the magnification of one or more subimages are bad, then the magnification errors will bias the aimpoint. If the bad subimage tracker can be detected and removed, the aimpoint may be recomputed based on the positions of the remaining good subimages.

Bad subimages may be detected by looking for large differences between the measured subimage location $\underline{x}$ and the estimated measurement $\underline{\hat{x}}$:

$$\delta \underline{x} = \underline{x} - \underline{\hat{x}} \quad (10)$$

Each estimated subimage location is determined from the estimated aimpoint. Typically this is accomplished by adding the product of an estimated magnification factor and the normalized offset vector to the estimated location of the aimpoint. The estimated aimpoint is itself determined by the location of all subimages, both good and bad, as described above.

Figure 9:
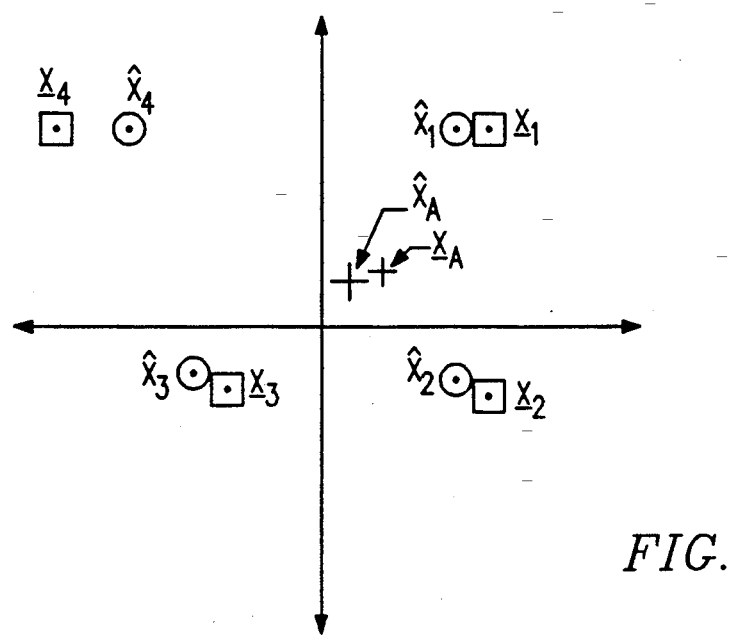
FIG. 9 mathematically depicts the target of FIG. 3 in a two-dimensional coordinate system.

FIG. 9 depicts the location of the measurements and the estimated measurements in a scenario such as FIG. 8. The measured locations of the subimages, $\underline{x}_1$, $\underline{x}_2$, $\underline{x}_3$, and $\underline{x}_4$ are indicated by squared points while the estimated measurements, $\underline{\hat{x}}_1$, $\underline{\hat{x}}_2$, $\underline{\hat{x}}_3$, and $\underline{\hat{x}}_4$ are indicated by circled points. The estimated and true aimpoints are indicated by $\underline{\hat{x}}_A$ and $\underline{x}_A$ respectively. Here, the residual, or error, $\epsilon_4$ of the upper left subimage $\underline{x}_4 - \underline{\hat{x}}_4$ is larger and of a different direction compared to the other three subimages. A robust statistical procedure may be used to detect the drift where:

$$M = \text{median } (\delta x_i), \, i=1, 2, \ldots N \quad (11)$$

$$MAD = \text{median } (|\delta x_i - M|), \, i=1, 2, \ldots N \quad (12)$$

MAD stands for the median absolute deviation. Other mathematical differences may also be used to test the behavior of each subimage.

The MAD is a robust estimator of the scale or spread of a distribution of values. The ratio MAD/0.6745 approaches the standard deviation for a Gaussian distribution as N becomes large. A robust T-test may be used of the form:

$$T_i = \sqrt{\frac{(\delta x_i - M)^2}{(MAD/0.6745)^2}} \, , \, i = 1, 2, \ldots N \quad (13)$$

If $T_i$ is greater than a predetermined displacement threshold, then the tracker measurement is considered bad and is deleted from the vector of subimage locations $\underline{x}$. The $T_i$ statistic will not be corrupted by bad subimages as long as the majority of the trackers are good. The test is performed for both the x and y image dimensions.

The robust T-test of Eq. (13) would eventually detect and reject the bad subimage of FIGS. 8 and 9. By recomputing the aimpoint and magnification estimates using a subset of the subimages of only the good measurements, the re-estimated aimpoint will be much closer to the true aimpoint.

Figure 10:
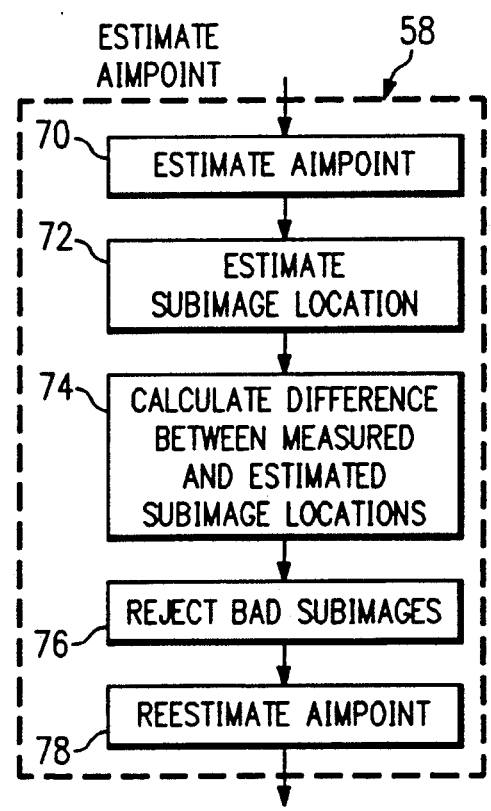
FIG. 10 depicts a flow chart of the disclosed general method of the invention.

FIG. 10 depicts the steps described above and is a detailed diagram of step 58 of FIG. 7. An aimpoint is estimated in block 70 initially using all subimages available to the tracker at a certain time. In block 72, each subimage location is estimated using the aimpoint estimate of block 70. This calculation may typically be accomplished by adding the product of a range normalized distance and magnification factor or factors (TIMF) to the aimpoint location. Each subimage has a range normalized distance that relates its location to the location of the aimpoint. A difference is calculated in block 74 between the estimated subimage location from block 72 and the measured location of each subimage in block 56 (FIG. 7). This difference is then statistically compared to a threshold value in block 76. If the difference exceeds the threshold value, then the subimage is rejected and deleted from the memory or database containing all of the subimages. In block 78, a new aimpoint is calculated using the revised aimpoint database.

ONE-DIMENSIONAL SUBIMAGE TRACKING

Figure 11:
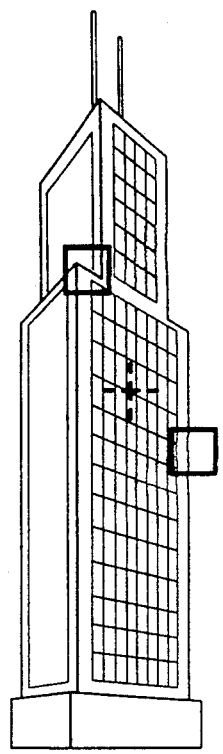
FIG. 11 depicts a target having at least one subimage associated with a line.

FIG. 11 depicts a target having a subimage associated with a line. Here, the target is a tall building, its aimpoint is indicated by a cross-hairs and it is tracked by two subimages indicated by small squares. The first subimage is associated with the right edge of the building. The second subimage is associated with a corner on the left side of the building. In practice, the aimpoint is determined by more than two subimages. The first subimage may be mistakenly found by the tracker at a subsequent time anywhere along the left edge of the building. The second subimage, however, will remain at the corner of the building. The first and second subimages are consequently called "one-dimensional" and "two-dimensional" subimages, respectively. The aimpoint will move from its original position if the one-dimensional subimage shifts up or down the left edge and nothing else is adjusted. The aimpoint may be held constant if the one-dimensional subimage is identified and if the tracker procedures are accordingly modified.

Identification of One-Dimensional Subimages

Figure 12A:
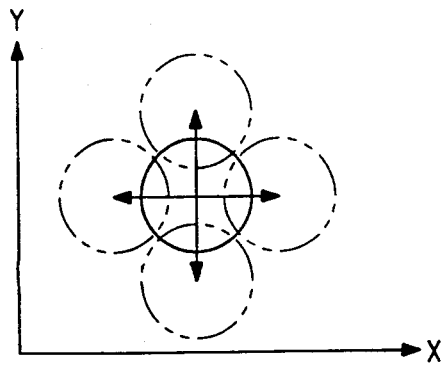
FIGS. 12a and 12b graphically depict a correlator test associated with a two-dimensional and a one-dimensional subimage, respectively.
Figure 12B:
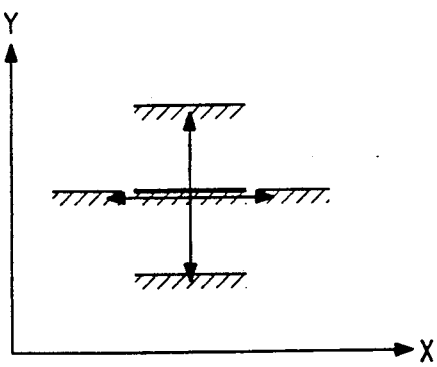

FIGS. 12a and 12b graphically depict a correlator test associated with a one-dimensional and a two-dimensional subimage, respectively. The correlator test used in the preferred embodiment is a modification of the correlator test used to locate subimages in the field of view of the tracker after an initial time. In the original correlator test, the absolute value of the difference between the gray level data of a reference image and of a subsequently acquired image is determined. The gray level data is generally the luminosity of the subimage at a particular pixel location. The luminosity is the infrared "brightness" of the image in the preferred embodiment. Other wavelengths of electromagnetic radiation may be used to track a target and, hence, may be compared according to the disclosed invention. The difference is determined for each pair of pixels in the two images within an image area. The first image area is centered around the reference subimage and the second image area is initially centered around the predicted location of the subimage at the subsequent time. The summed difference is calculated several times. Each time, the center of the subimage in the subsequently acquired image is indexed or moved a predetermined amount. Each pixel is thereby shifted a predetermined amount, typically one pixel. This causes a different set of gray level data pairs to be subtracted from one another. The set having the smallest summed difference indicates the actual location of the subimage in the subsequently acquired image. The center of the actual subimage is then used as the location of the subimage at the later time by the tracker for mid-course tracking.

The correlator test may be modified to determine the dimensionality of a particular subimage (1-D versus 2-D). In this modified test, the gray level data of the subimage is compared to the indexed gray level data of the subimage at the *same* time. The previously described difference for each pixel pair is calculated, summed over the image and saved. In FIG. 12a, a subimage having a circular shape is indexed through an image space and compared to the original subimage. As depicted, the subimage is indexed through image space having roughly a diamond shape. The diamond is seven pixels high by seven pixels wide and is further described in connection with FIG. 14. This results in twenty-eight sets of comparisons. (The comparison when the subimage is indexed to its original position is always zero.) In FIG. 12b, a part of an edge is depicted. It is also indexed through an image space having a diamond shape. Only the four most extreme locations of each indexed subimage is depicted in each FIGURE. The indexed subimages in FIGS. 12a and 12b are depicted as dashed circles or edges. The actual subimages are depicted as a solid circle or edge.

Figure 13B:
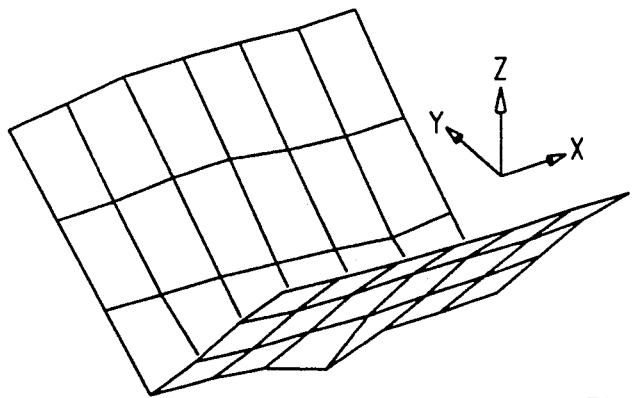
FIGS. 13a and 13b graphically depict the surfaces generated by the correlator tests of FIGS. 12a and 12b, respectively.
Figure 13A:
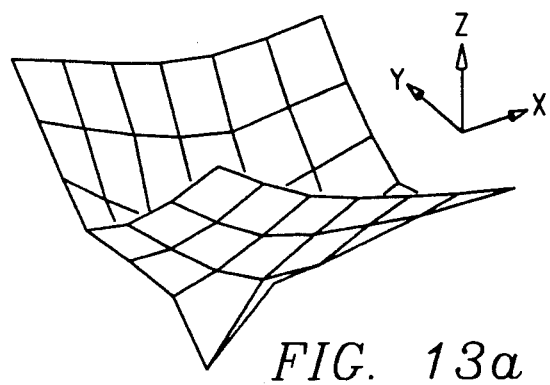

FIGS. 13a and 13b graphically depict the surfaces generated by the correlator tests of FIGS. 12a and 12b, respectively. Each surface depicts the summed differences for each indexed location (x, y) as a value along the z-axis. A two-dimensional subimage like the one depicted in FIG. 12a generates the bowl shaped surface depicted in FIG. 13a. A one-dimensional subimage like the one depicted in FIG. 12b generates the V-shaped surface depicted in FIG. 13b.

Figures 14, 15:
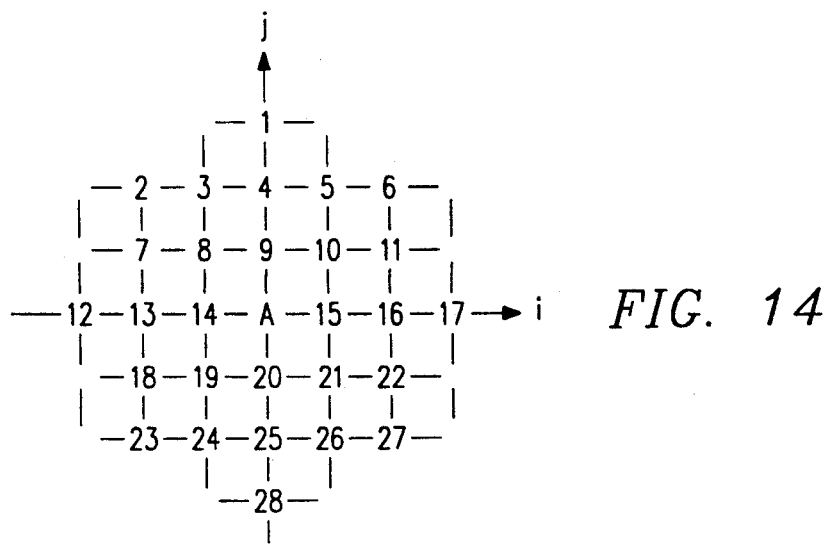
FIG. 14 graphically depicts the orientation of correlator points used in conjunction with the surfaces of FIGS. 13a and 13b.
FIG. 15 depicts a matrix of constants used in conjunction with the correlator points of FIG. 14.

The shape of the surface generated by the twenty-eight correlator differences may be used to determine the dimensionality of the subimage. The surface is statistically fit to a model paraboloid having the form:

$$C(i,j) = ai^2 + 2bij + cj^2 + d \qquad (14)$$

where $C(i,j)$ is the summed difference corresponding to the shifted subimage centered at $(i,j)$ and a, b, c and d are constants. The indices i and j are analogous to the x and y coordinate axes, respectively, depicted in FIGS. 12a through 13b. The constants may be determined by a linear least squares curve fit:

$$\begin{bmatrix} a \\ b \\ c \end{bmatrix} = GC \qquad (15)$$

where C is a $28 \times 1$ data vector containing the values of $C(i,j)$ and G is a $3 \times 28$ matrix of predetermined constants. The ordering of C and the extent of subimage indexing undertaken in FIGS. 12a and 12b are depicted in FIG. 14. The contents of G are depicted in FIG. 15. Once the constants a, b and c are determined, the eigenvalues of the $2 \times 2$ matrix:

$$\begin{bmatrix} a & b \\ b & c \end{bmatrix} \qquad (16)$$

are computed. The maximum and minimum eigenvalues, $\lambda_{max}$ and $\lambda_{min}$, are calculated according to the relations:

$$\lambda_{max} = \frac{a+c}{2} + \frac{[(a-c)^2 + 4b^2]^{\frac{1}{2}}}{2} \qquad (17)$$

and $$\lambda_{min} = \frac{a+c}{2} - \frac{[(a-c)^2 + 4b^2]^{\frac{1}{2}}}{2} \qquad (18)$$

The ratio of these two eigenvalues, $\lambda_{max}/\lambda_{min}$, may be used to distinguish one-dimensional subimages from two-dimensional subimages. If the ratio is greater than a predetermined constant such as 12, then the subimage is considered a one-dimensional subimage.

TRACKING WITH ONE-DIMENSIONAL SUBIMAGES

Figure 16:
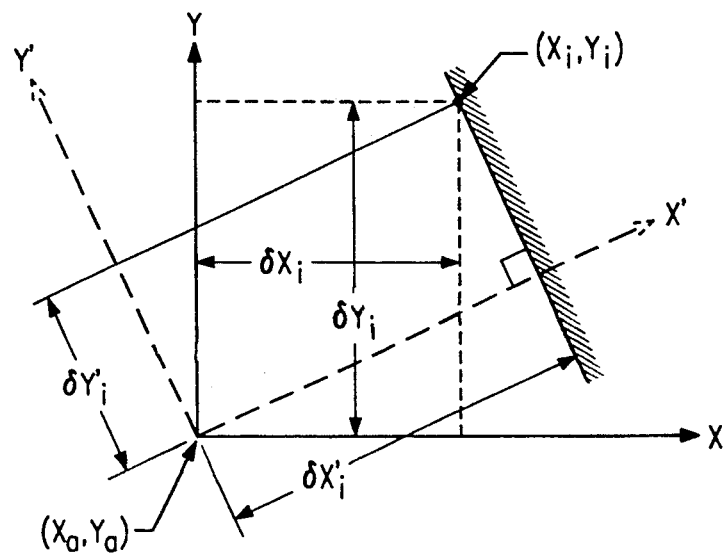
FIG. 16 mathematically depicts a one-dimensional subimage associated with a line with a first and second coordinate system.

FIG. 16 mathematically depicts a subimage i at $(x_i, y_i)$ associated with a line with a first (x and y) and a second (x' and y') coordinate system. Both coordinate systems are centered on the aimpoint at $(x_a, y_a)$. The line is indicated by hatching on one of its sides.

If Q is a linear transformation representing an orthonormal basis set, then $$\underline{x}' = Q^T \underline{x} \qquad (19)$$

represents the transformation of vector $\underline{x}$ into $\underline{x}'$ whose components are defined with respect to the x' and y' coordinate frame. The matrix $Q^T$ comprises the maximum and minimum eigenvectors, $\underline{Q}_{max}^T$ and $\underline{Q}_{min}^T$, of the $2 \times 2$ matrix:

$$\begin{bmatrix} a & b \\ b & c \end{bmatrix} \quad (20)$$

Additionally, $Q^{-1}$ equals $Q^T$. Therefore, $$\underline{x} = Q\underline{x}' \quad (21)$$

If $\delta \underline{x}_i = \underline{x}_i - \underline{x}_a$ then the subimage may be related to the aimpoint in the eigenspace represented by Q through the relations:

$$\delta \underline{x}_i = s\underline{d}_i + \underline{n}_i \quad (22)$$

$$Q_i^T \delta \underline{x}_i = sQ_i^T \underline{d}_i + Q_i^T \underline{n}_i \quad (23)$$

$$\delta \underline{x}'_i = s\underline{d}'_i + \underline{n}'_i \quad (24)$$

$$\begin{bmatrix} \underline{q}^T_{i max} \\ \underline{q}^T_{i min} \end{bmatrix} \delta \underline{x}_i = \begin{bmatrix} \underline{q}^T_{i max} \\ \underline{q}^T_{i min} \end{bmatrix} \underline{d}_i + \begin{bmatrix} \underline{q}^T_{i max} \\ \underline{q}^T_{i min} \end{bmatrix} \underline{n}_i \quad (25)$$

From FIG. 16, the only component of $\delta \underline{x}'_i$ which gives useful information is $\delta x'_i$, the component of $\delta \underline{x}'_i$ perpendicular to the line containing the ith subimage at $(x_i, y_i)$:

$$\underline{q}_{i,max}^T \delta \underline{x}_i = s\underline{q}_{i,max}^T \underline{d}_i + \underline{q}_{i,max}^T \underline{n}_i \quad (26)$$

This may be rewritten as $$\underline{q}_{i,max}^T (\underline{x}_i - \underline{x}_a) = sd_{i,max} + n_{i,max} \quad (27)$$

where $d_{i,max}$ and $n_{i,max}$ are the components of the normalized distance between the aimpoint and the ith subimage and of the noise vector, respectively, which are along or parallel to the maximum eigenvector. This may be further rewritten as:

$$x_{i,max} = q_{i,1,max} x_a + q_{i,2,max} y_a + sd_{i,max} + n_{i,max} \quad (28)$$

and $$x_{i,max} = [q_{i,1,max} q_{i,2,max} d_{i,max}] \begin{bmatrix} x_a \\ y_a \\ s \end{bmatrix} + n_{i,max} \quad (29)$$

where $$\underline{q}_{i,max}^T = \begin{bmatrix} q_{i,1,max}^T \\ q_{i,2,max}^T \end{bmatrix} \quad (30)$$

For each one-dimensional subimage i, the vector $[q_{i,1,max} \ q_{i,2,max} \ d_{i,max}]$ may be directly substituted into the ith row of the H matrix described above (Eq. (6)). In particular, $q_{i,1,max}$ is substituted into the first column, ith row, $q_{i,2,max}$ is substituted into the second column, ith row, and $d_{i,max}$ is substituted into the third column, ith row. For a condition where there are four subimages, the second and third subimages being one-dimensional and the remaining subimages being two-dimensional, the H matrix would be $$\begin{bmatrix} 1 & 0 & d_{x1} \\ q_{1,2,max} & q_{2,2,max} & d_{2,max} \\ q_{1,2,max} & q_{2,3,max} & d_{3,max} \\ 1 & 0 & d_{x4} \\ 0 & 1 & d_{y1} \\ 0 & 1 & d_{y4} \end{bmatrix} \quad (31)$$

For every one-dimensional subimage i, the 2ith row is removed without substitution. Alternatively, for such one-dimensional subimage i, the vector $[q_{i,1,max} \ q_{i,2,max} \ d_{i,max}]$ may be substituted into the 2ith row and the ith row removed. In this manner, a composite H matrix may be assembled by which two-dimensional subimages may be simultaneously tracked with one-dimensional subimages. The values for $x_{i,max}$ and $d_{i,max}$ are calculated by multiplying $\underline{x}_i$ and $\underline{d}_i$, respectively, by the maximum eigenvector $q_{i,max}^T$. Given this specification, the calculation of the eigenvectors will be apparent to one skilled in the art. The H matrix is then used to solve for the vector $\hat{\theta}$ as described above (see Eq. (9)).

Error Checking with One-Dimensional Subimages

Figure 17:
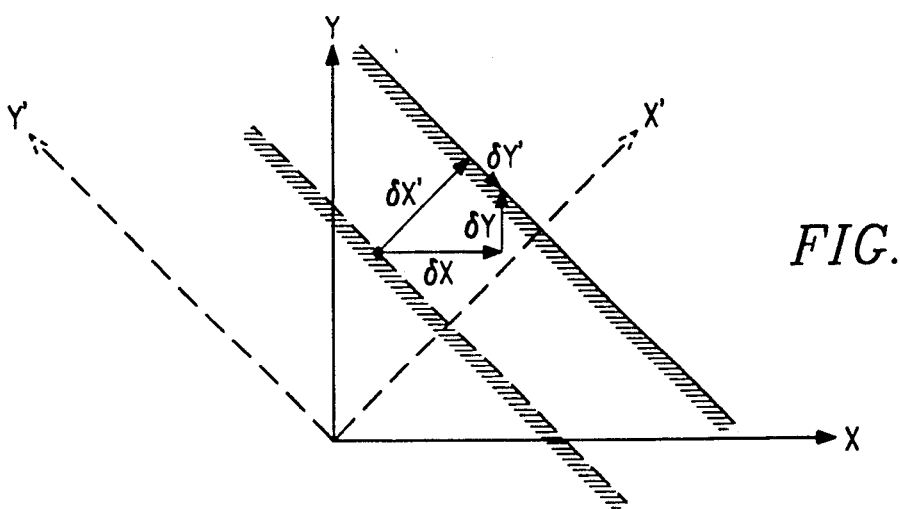
FIG. 17 further depicts the one-dimensional subimage depicted in FIG. 16.

FIG. 17 further depicts the subimage depicted in FIG. 16. The residual $\epsilon^T$ for a 1-D tracker is a transformed version of the residual in the original coordinate system.

$$\epsilon^T_i = \underline{q}^T_{i,max} (\underline{x}_i - \hat{\underline{x}}_i) \quad (32)$$

The quantity $q_{i,max}^T (\underline{x}_i - \hat{\underline{x}}_i)$ is graphically represented in FIG. 17 as dx'. Bad subimages may therefore be tested and rejected as described for the general case after being multiplied by the maximum eigenvector. For 1-D subimage rejection, the quantity $\epsilon_i^T$ is substituted for $\delta x_i$ in equations (11), (12) and (13), and the same T-test is performed.

Figure 18:
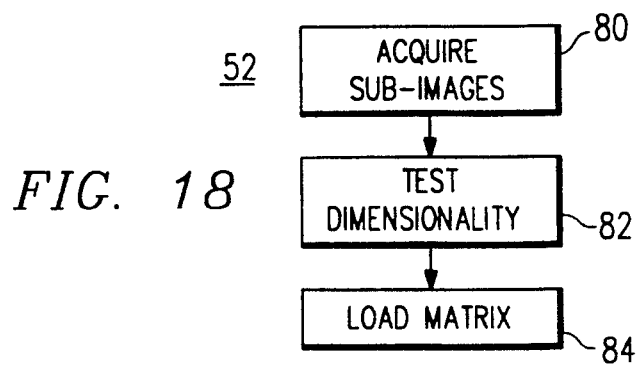
FIG. 18 depicts part of a flow chart of an embodiment of the invention which distinguishes one- and two-dimensional subimages.

FIG. 18 depicts part of the flow chart of FIG. 7. Block 52 comprises blocks 80, 82 and 84. In these blocks, the tracker acquires all subimages, categorizes each subimage as either 1-D or 2-D and for each subimage, loads the H matrix with either a set of 2-D values (see Eq. 6) or a set of 1-D values (see, e.g., Eq. 31), as appropriate. Each of these steps is more fully described above.

Appendices A-H contain FORTRAN computer code disclosing one embodiment of the disclosed invention. In particular, Appendix A discloses the subroutine TRTEST and related functions for determining the dimensionality of a subimage. Appendix B discloses the subroutine DBADD for adding a subimage to the tracker's database. Appendix C discloses the subroutine EIGENV for calculating the eigenvalues and eigenvectors of a selected subimage. Appendix D discloses subroutine TRKNORNG2D for computing the aimpoint location using a single magnification model. Appendix E discloses the subroutine INTJITTER for rejecting bad subimages associated with an aimpoint under the subroutine TRKNORNG2D. Appendix F discloses the subroutine LEASTSQ for calculating the least-squares estimate of a parameter vector. Appendix G discloses the common block variable declaration PROCPARM for the previous subroutines. Appendix H discloses a library of subroutines useful primarily for matrix math called by the previous subroutines.

Although the present invention and its advantages have been described in detail, it should be understood that various changes, substitutions and alterations can be made herein without departing from the spirit and scope of the invention as defined by the appended claims.

APPENDIX A

```
C*********************************************************************
C                                                                     *
C                       RESTRICTED RIGHTS LEGEND                      *
C                                                                     *
C USE, DUPLICATION OR DISCLOSURE IS SUBJECT TO RESTRICTIONS STATED    *
C IN CONTRACT NO. DAAH01-89-C-A012-TI01 WITH TEXAS INSTRUMENTS        *
C INCORPORATED.                                                       *
C                                                                     *
C             RESTRICTED RIGHTS DATA SECTION STARTS HERE.             *
C                                                                     *
C*********************************************************************
C                                                                     *
C                          Texas Instruments                          *
C                    T I   I N T E R N A L   D A T A                  *
C                 Property of Texas Instruments ONLY                  *
C                                                                     *
C*********************************************************************
C
        SUBROUTINE TRTEST (X, Y, TRACKER, THETA, PASSED)
C
C*********************************************************************
C
C  NAME:       TRTEST
C
C  FUNCTION:   Performs trackability tests on a tracker location
C
C  DESCRIPTION:
C        Initialize the passed flag to false
C        Initialize trackability scores and subpixel shifts to zero
C        Determine if recorrelation will be required
C        Determine the start of the location to compute the local contrast score
C        Execute routine to compute the local contrast
C        If the local contrast >= threshold Then
C           If recorrelation will be required Then
C              Set passed flag to current tracker status
C           Else recorrelation not required
C              Determine the start of the tracker subimage
C              If compute subpixel estimate Then
C                 Compute sharpness ratio and subpixel estimate simultaneously
C              Else don't compute subpixel estimate
C                 Compute the sharpness ratio from autocorrelation surface
C              End If compute subpixel estimate
C              If the sharpness ratio <= threshold and > 0 Then
C                 Set passed flag to 2 (2-D trackable)
C              Else if the sharpness ratio >= 1-D theshold Then
C                 Set passed flag to 1 (1-D trackable)
C              End If recorrelation not required
C           Else
C              Set passed flag to -1 (not trackable)
C           End If recorrelation required
C        End If local contrast >= threshold
C
C  REFERENCES:
C        None
C
C---------------------------------------------------------------------
C
C  CALLING SEQUENCE:
C        CALL TRTEST (X, Y, TRACKER, THETA, PASSED, RECORRELATE)
C
C  INPUTS:
C        X, Y        - Center of test region
C        TRACKER     - Current tracker number
C
C  OUTPUTS:
C        THETA       - Correlation surface least squares fit parameters
C        PASSED      -  1 => Location passed 1-D trackability tests
C                       2 => Location passed 2-D trackability tests
C                      -1 => Location failed all tests
C
```

```
C   DEPENDENCIES:
C       Common Blocks
C           PROCPARMS - Processing parameters
C           TKPTPARMS - Trackpoint parameters
C       Functions
C           SSACFS - Computes autocorrelation sharpness ratio trackability score
C           SSCCFS - Computes cross-correlation sharpness ratio/subpixel estimate
C           SSCONT - Computes the local contrast from a histogram
C
C   SIDE EFFECTS:
C       None
C
C   TARGET PROCESSOR:
C       VAX 8000 series VMS 4.5, Fortran Compiler 4.5-219
C
C   HISTORY:
C       11/04/88    R. Broussard    Initial Release
C       04/17/91    D. Van Rheeden  Modified to use SSCONT and SSACFS
C       07/29/91    D. Van Rheeden  Compute subpixel estimate by SSCCFS
C       Date        Programmer      Description                         STR
C       ----        ----------      -----------                         ---
C       10/17/91    D. Van Rheeden  Replace SHIFTX,Y with THETA array   1663
C       10/17/91    D. Van Rheeden  Change PASSED flag to INTEGER*2     1663
C       10/29/91    D. Van Rheeden  Modify INCLUDE's to make Silicon    1664
C                                   Graphics compatible
C       11/13/91    D. Van Rheeden  Add recorrelation test              1665
C       12/09/91    D. Van Rheeden  Added restricted rights legend      1735
C       02/17/92    D. Van Rheeden  Check recorrelate status in DBASE   2020
C                                   before setting RECORRELATE flag
C
C*******************************************************************
C
C   Local Variables
C
C       RECORRELATE     Recorrelation required flag
C       TEMP_SR         Temporary sharpness ratio
C       TESTX, TESTY    Test locations for subroutines
C
C*******************************************************************
C
C   Variable Delarations
C
        IMPLICIT NONE
C
        INCLUDE 'procparm.cmn'  ! Processing parameters
        INCLUDE 'tkptparm.cmn'  ! Trackpoint parameters
C
        INTEGER*4       TESTX, TESTY, TRACKER, X, Y
C
        INTEGER*4       PASSED, SSACFS, SSCONT, THETA(5)
C
        REAL*4          SSCCFS, TEMP_SR
C
        LOGICAL*4       RECORRELATE
C
C*******************************************************************
C                                                                   *
C                       EXECUTABLE CODE                             *
C                                                                   *
C*******************************************************************
C
C   Initialize the passed flag to false, the trackability test values
C   to zero, and the subpixel shift estimates to zero.
C
        PASSED = -1
        CONT = 0
        SR = 0
C
C   Determine if recorrelation will be required.  Recorrelation is
C   necessary if the absolute difference between the predicted
C   and measured tracker location is greater than the +- search area
C   dimension minus 2.  Additional correlation surface values would
C   be required since the sharpness test and subpixel estimator use
C   a 5x5 pixel correlation surface.
```

```
C
          IF (TRACKER .GT. 0) THEN
             RECORRELATE =
     &       (ABS(DBASE(TRACKER,2) - DBASE(TRACKER,11)) .GT. (DCSERX-2) .OR.
     &        ABS(DBASE(TRACKER,3) - DBASE(TRACKER,12)) .GT. (DCSERY-2))
     &        .AND. (DBASE(TRACKER,18) .EQ. -1)
          ELSE
             RECORRELATE = .FALSE.
          END IF
C
C   Compute the local contrast score at specified location.
C
          TESTX = X - ((HGREFX-1) / 2)
          TESTY = Y - ((HGREFY-1) / 2)
          CONT = SSCONT (TESTX, TESTY)
C
C   If local contrast passes then ...
C
          IF (CONT .GT. CONTTH) THEN
             IF (RECORRELATE) THEN
C
C   Recorrelation will be required.  Set the PASSED flag to the status
C   of the tracker being tested, and set the recorrelate database entry.
C
                PASSED = DBASE(TRACKER,1)
                DBASE(TRACKER,18) = 2
             ELSE
C
C   Do the sharpness ratio test.
C
                TESTX = X - ((DCREFX-1) / 2)
                TESTY = Y - ((DCREFY-1) / 2)
                IF (COMPUTE_SUBPIX) THEN
                   TEMP_SR = SSCCFS (TRACKER, TESTX, TESTY, THETA)
                   SR = NINT(TEMP_SR)
                ELSE
                   SR = SSACFS (TESTX, TESTY)
                END IF
C
C   If the test passes, set the passed flag to the subimage dimension.
C
                IF (TEMP_SR .LE. SRTH .AND. TEMP_SR .GT. 0) THEN
                   PASSED = 2    ! 2-D trackable
                ELSE IF (TEMP_SR .GE. SRTH1D) THEN
                   PASSED = 1    ! 1-D trackable
                END IF
C
             END IF  ! recorrelation required
C
          END IF  ! cont > contth
C
          RETURN
          END
```

APPENDIX B

```
C***************************************************************
C                                                              *
C             RESTRICTED RIGHTS LEGEND                         *
C                                                              *
C USE, DUPLICATION OR DISCLOSURE IS SUBJECT TO RESTRICTIONS STATED *
C IN CONTRACT NO. DAAH01-89-C-A012-TI01 WITH TEXAS INSTRUMENTS *
C INCORPORATED.                                                *
C                                                              *
C         RESTRICTED RIGHTS DATA SECTION STARTS HERE.          *
C                                                              *
C***************************************************************
C                                                              *
C                    Texas Instruments                         *
C                 T I  I N T E R N A L  D A T A                *
C              Property of Texas Instruments ONLY              *
C                                                              *
C***************************************************************
```

```
C
      SUBROUTINE DBADD (X, Y, THETA, TRKDIM, ZONE)
C
C*********************************************************************
C
C  NAME:      DBADD
C
C  FUNCTION:  Add a tracker to the database
C
C  DESCRIPTION:
C       Find the next available slot, if any, to put the new tracker
C       If a location was found then
C          Initialize all the values to zero
C          Initialize the database with the tracker information and set the
C             valid tracker and replace flags
C          If a 1-D tracker then compute the inverse measurement covariance
C          Increment the trackers per zone counter
C          Compute the location of the reference image in APAP A memory
C          Compute the location to store the reference image in APAP B memory
C          Transfer the reference image
C          Assign the current tracker output LUNO and increment the LUNO counter
C       End of if
C
C  REFERENCES:
C       None
C
C---------------------------------------------------------------------
C
C  CALLING SEQUENCE:
C       CALL DBADD (X, Y, THETA, TRKDIM, ZONE)
C
C  INPUTS:
C       X, Y   - Coordinates of the center of the new tracker
C       THETA  - Correlation surface least squares fit parameters
C       TRKDIM - Tracker dimension (1 = 1-D, 2 = 2-D)
C       ZONE   - Zone of the new tracker
C
C  OUTPUTS:
C       None
C
C  DEPENDENCIES:
C     Common Blocks
C       APMEMYS   - APAP A and B memories
C       PROCPARMS - Processing parameters
C       SSCNSTS   - Subimage selection constants
C       TKPTPARMS - Trackpoint parameters
C     Subroutines
C       EIGENV    - Computes correlation surface eigenvalues/vectors
C       SUBPIX    - Subpixel position estimator.
C
C  SIDE EFFECTS:
C       None
C
C  TARGET PROCESSOR:
C       VAX 8000 series VMS 4.5, Fortran Compiler 4.5-219
C
C  HISTORY:
C       12/02/88   R. Broussard   Initial Release
C       05/31/91   D. Van Rheeden Compute normalized distances, DISTX,Y
C       06/17/91   D. Van Rheeden Initialize saved correlator locations
C       07/29/91   D. Van Rheeden Added subpixel shift estimates
C       Date       Programmer     Description                         STR
C       ----       ----------     -----------                         ---
C       10/17/91   D. Van Rheeden Add logic to handle 1-D trackers    1663
C       10/29/91   D. Van Rheeden Modify INCLUDE's to make Silicon    1664
C                                 Graphics compatible
C       11/18/91   D. Van Rheeden Initialize recorrelate flag         1665
C       11/20/91   D. Van Rheeden Modify 1-D initialization           1663
C       11/25/91   D. Van Rheeden Use right-hand coordinates to       1663
C                                 initialize normalized distances
C       12/05/91   D. Van Rheeden Initialize floating point tracker   1665
C                                 measurements
C       12/09/91   D. Van Rheeden Added restricted rights legend      1735
C       02/03/92   D. Van Rheeden Add D-lines to write THETA's        1963
C       02/17/92   D. Van Rheeden Check the RANGE_GOOD flag to        2020
C                                 determine if reference updating
C                                 should be done by testing
C                                 tracker age or magnification
C
C*********************************************************************
```

```
C
C   Local Variables
C
C       DX, DY              Temporary tracker normalized distances
C       I, J                Loop conters
C       MXSTRT              Starting row to store reference subimage in B memory
C       MYSTRT              Starting column to store reference subimage in B memory
C       SX, SY              Tracker subpixel estimates
C       TRACKER             Location in database to place the new tracker data
C       XSTRT               Starting column of reference subimage in A memory
C       YSTRT               Starting row of reference subimage in A memory
C
C*****************************************************************
C
C   Variable Delarations
C
        IMPLICIT NONE
C
        INCLUDE 'apmemy.cmn'    ! APAP A and B memories
        INCLUDE 'procparm.cmn'  ! Processing parameters
        INCLUDE 'sscnst.cmn'    ! Subimage selection constants
        INCLUDE 'tkptparm.cmn'  ! Trackpoint parameters
C
        INTEGER*4       YSTRT, I, J, MXSTRT, MYSTRT, XSTRT, THETA(5),
     &                  TRKDIM, TRACKER, X, Y, ZONE
C
        REAL*4          DX, DY, SX, SY
C
D       INTEGER*4       HISTX, HISTY
C
C*****************************************************************
C                                                                *
C                       EXECUTABLE CODE                          *
C                                                                *
C*****************************************************************
C
C   Find an empty slot to put the tracker in the database.
C
        TRACKER = 0
        I = 1
        DO WHILE (TRACKER .EQ. 0 .AND. I .LE. MAXT)
          IF (DBASE(I,1) .EQ. -1) THEN
            TRACKER = I
          ELSE
            I = I + 1
          END IF
        END DO  ! while i <= maxt
C
C   If still no slot for the tracker, replace a tracker tagged for replacement.
C
        IF (TRACKER .EQ. 0) THEN
          I = 1
          DO WHILE (TRACKER .EQ. 0 .AND. I .LE. MAXT)
            IF (DBASE(I,7) .EQ. -1) THEN
              TRACKER = I
            ELSE
              I = I + 1
            END IF
          END DO  ! while i <= maxt
        END IF  ! empty slot not found
C
C   If a location was found, load the tracker data into the database and save
C   the tracker output logical unit number.
C
        IF (TRACKER .NE. 0) THEN
          DO I = 9, MAXP
            DBASE(TRACKER,I) = 0
          END DO
          DBASE(TRACKER, 1) = TRKDIM   ! Tracker status (dimension)
          DBASE(TRACKER, 2) = X        ! X measured location
          DBASE(TRACKER, 3) = Y        ! Y measured location
          DBASE(TRACKER, 4) = CONT     ! Contrast value
          DBASE(TRACKER, 5) = SR       ! Sharpness ratio
          DBASE(TRACKER, 6) = ZONE     ! Current tracker zone
          DBASE(TRACKER, 7) = 2        ! Out-of-bounds indicator
          IF (RANGE_GOOD) THEN         ! Reference update threshold
            DBASE(TRACKER, 8) = RANGE/1.25
```

```
              ELSE
                DBASE(TRACKER, 8) = AGETH
              END IF
              DBASE(TRACKER,13) = -1          ! Reference update flag
              DBASE(TRACKER,16) = X           ! Previous X measured location
              DBASE(TRACKER,17) = Y           ! Previous Y measured location
              DBASE(TRACKER,18) = -1          ! Recorrelate flag
              IF (RANGE_GOOD) THEN            ! Reference update test type:
                DBASE(TRACKER,19) = 2         !   Range magnification
              ELSE
                DBASE(TRACKER,19) = 1         !   Tracker age
              END IF
              SX = 0.0
              SY = 0.0
              IF (COMPUTE_SUBPIX .AND. TRKDIM .EQ. 2) THEN
                CALL SUBPIX (THETA, SX, SY)
              END IF
              MEASX(TRACKER)    = X + SX
              MEASY(TRACKER)    = Y - SY
              OLDX(TRACKER)     = MEASX(TRACKER)
              OLDY(TRACKER)     = MEASY(TRACKER)
              DISTX(TRACKER)    = (MEASX(TRACKER) - AIMX) / RSIZEX
              DISTY(TRACKER)    = (AIMY - MEASY(TRACKER)) / RSIZEY
              DIST2DX(TRACKER)  = (MEASX(TRACKER) - AIMX) / MAGNIFY
              DIST2DY(TRACKER)  = (AIMY - MEASY(TRACKER)) / MAGNIFY
C
C   If this is a 1-D tracker, compute the eigenvalues and eigenvectors of
C   the fitted correlation surface.  Then transform the normalized distances
C   by the eigenvector transformation and keep the normalized distance which
C   corresponds to the maximum eigenvalue.
C
              IF (TRKDIM .EQ. 1) THEN
                CALL EIGENV (THETA, EIGENVALUE(1,TRACKER),
     &                              EIGENVECTOR(1,1,TRACKER))
                DX = DISTX(TRACKER)
                DY = DISTY(TRACKER)
                DISTX(TRACKER)  = EIGENVECTOR(1,1,TRACKER) * DX
     &                          + EIGENVECTOR(2,1,TRACKER) * DY
                DISTY(TRACKER)  = EIGENVECTOR(1,2,TRACKER) * DX
     &                          + EIGENVECTOR(2,2,TRACKER) * DY
                DX = DIST2DX(TRACKER)
                DY = DIST2DY(TRACKER)
                DIST2DX(TRACKER) = EIGENVECTOR(1,1,TRACKER) * DX
     &                           + EIGENVECTOR(2,1,TRACKER) * DY
                DIST2DY(TRACKER) = EIGENVECTOR(1,2,TRACKER) * DX
     &                           + EIGENVECTOR(2,2,TRACKER) * DY
              END IF
C
C   Increment the trackers per zone counter.
C
              TRPZN(ZONE) = TRPZN(ZONE) + 1
C
C   Determine the location of the subimage in A memory and where to store it
C   in B memory.
C
              XSTRT  = DBASE(TRACKER, 2) - (DCREFX - 1)/2
              YSTRT  = DBASE(TRACKER, 3) - (DCREFY - 1)/2
              MXSTRT = MOD((TRACKER-1),8) * 16 + 1
              MYSTRT = ((TRACKER-1)/8) * 16 + 1
C
C   Store the reference subimage in B memory.
C
              DO J = 1, DCREFY
                DO I = 1, DCREFX
                  DMEMYB(MXSTRT+I-1,MYSTRT+J-1) =
     &                                DMEMYA(XSTRT+I-1,YSTRT+J-1)
                END DO
              END DO
C
C   For debugging........
C
D             WRITE (LUNN, *)
D             WRITE (LUNN, *) ' CYC  TRKR   ROW   COL   LC   SR   ZN  REFTH'
D             WRITE (LUNN, 9) CYCLE, TRACKER, X, Y, CONT, SR,
D    &                        ZONE, DBASE(TRACKER,8)
D   9         FORMAT(1X,I4, 5X,I2, 3X,I4, 2X,I4, 3(2X,I3), 2X,I6)
```

```
C
D        HISTX = X - (HGREFX-1)/2
D        HISTY = Y - (HGREFY-1)/2
D        WRITE (LUNN, *)
D        WRITE (LUNN, *) '                    LOCAL CONTRAST REGION'
D        WRITE (LUNN, *)
D        DO I = 1, HGREFX
D           WRITE (LUNN, 10) (DMEMYA((HISTX+I-1),(HISTY+J-1)), J=1,HGREFY)
D  10    FORMAT(16I5)
D        END DO
C
D        WRITE (LUNN, *)
D        WRITE (LUNN, *) '                    AUTO-CORRELATION SURFACE'
D        WRITE (LUNN, *)
D        DO I = 1, 5
D           WRITE (LUNN, 10) (ACOR(I,J), J=1,5)
D        END DO
C
D        WRITE (LUNN, *)
D        WRITE (LUNN, 15) (THETA(I), I=1,5)
D  15    FORMAT(5X, 'THETA(1..5) = ',5I7)
C
C Store the current output logical unit number and increment the counter.
C
         TRLUN(TRACKER) = LUNN
D        OPEN(UNIT=LUNN, STATUS='NEW')
         LUNN = LUNN + 1
C
         END IF   ! a tracker location was found

RETURN
         END
```

APPENDIX C

```
C*********************************************************************
C                                                                    *
C                    RESTRICTED RIGHTS LEGEND                        *
C                                                                    *
C USE, DUPLICATION OR DISCLOSURE IS SUBJECT TO RESTRICTIONS STATED   *
C IN CONTRACT NO. DAAH01-89-C-A012-TI01 WITH TEXAS INSTRUMENTS       *
C INCORPORATED.                                                      *
C                                                                    *
C           RESTRICTED RIGHTS DATA SECTION STARTS HERE.              *
C                                                                    *
C*********************************************************************
C                                                                    *
C                         Texas Instruments                          *
C                    T I   I N T E R N A L   D A T A                 *
C                    Property of Texas Instruments ONLY              *
C                                                                    *
C*********************************************************************
C
         SUBROUTINE EIGENV (THETA, EIGENVALUE, EIGENVECTOR)
C
C*********************************************************************
C
C NAME:        EIGENV
C
C FUNCTION:    Computes the eigenvalues and eigenvectors of the least
C              squares fit model of the correlation surface.
C
C DESCRIPTION:
C     Convert theta parameters from integer to real values.
C     Compute the eigenvalues from the least squares fit parameters.
C     Compute the eigenvector matrix.
C
C REFERENCES:
C     Widrow, B. and Stearns, S., Adaptive Signal Processing,
C     Prentice-Hall, Inc., Englewood Cliffs, NJ, 1985, pp. 33-43.
C
C---------------------------------------------------------------------
```

```
C
C  CALLING SEQUENCE:
C       CALL EIGENV (THETA, EIGENVALUE, EIGENVECTOR)
C
C  INPUTS:
C       THETA         - Correlation surface least squares fit parameters
C
C  OUTPUTS:
C       EIGENVALUE    - Eigenvalues of the fitted correlation surface
C                       EIGENVALUE(1) ==> Maximum eigenvalue
C                       EIGENVALUE(2) ==> Minimum eigenvalue
C       EIGENVECTOR   - Eigenvectors of the fitted correlation surface
C                       EIGENVECTOR(*,1) ==> Corresponds to max eigenvalue
C                       EIGENVECTOR(*,2) ==> Corresponds to min eigenvalue
C
C  DEPENDENCIES:
C       None
C
C  SIDE EFFECTS:
C       None
C
C  TARGET PROCESSOR:
C       VAX 8000 series VMS 4.5, Fortran Compiler 4.5-219
C
C  HISTORY:
C       Date         Programmer        Description                  STR
C       ----         ----------        -----------                  ---
C       10/17/91     D. Van Rheeden    Initial Release              1663
C       12/09/91     D. Van Rheeden    Added restricted rights legend 1735
C
C***************************************************************************
C
C  Local Variables
C
C       A             Temporary calculation value
C       B, C          Eigenvector matrix elements
C       INDEX         Do loop index
C       NORM          Eigenvector normalization factor
C       ROOT          Root value in the quadratic equation solution
C       RTHETA        Real valued THETA array
C
C***************************************************************************
C
C  Variable Delarations
C
       IMPLICIT NONE
C
       INTEGER*4     INDEX, THETA(5)
C
       REAL*4        A, B, C, EIGENVALUE(2), EIGENVECTOR(2,2),
     &               NORM, ROOT, RTHETA(5)
C
C***************************************************************************
C                                                                          *
C                         EXECUTABLE CODE                                   *
C                                                                          *
C***************************************************************************
C
C  Convert theta parameters from integer to real values.
C
       DO INDEX = 1,5
          RTHETA(INDEX) = SNGL (THETA(INDEX))
       END DO
C
C  Compute the eigenvalues from the least squares fit parameters.
C
       A = RTHETA(4) + RTHETA(5)
       ROOT = SQRT ((RTHETA(4) - RTHETA(5))**2 + 4 * RTHETA(3)**2)
       EIGENVALUE(1) = 0.5 * (A + ROOT)
       EIGENVALUE(2) = 0.5 * (A - ROOT)
C
C  Compute the eigenvector matrix.
C
       B = RTHETA(4) - RTHETA(3) - EIGENVALUE(2)
       C = RTHETA(5) - RTHETA(3) - EIGENVALUE(2)
       NORM = B**2 + C**2
```

```
      IF (NORM .EQ. 0.0) THEN   ! A trivial solution
        C = RTHETA(4) - RTHETA(3) - EIGENVALUE(1)
        B = -(RTHETA(5) - RTHETA(3) - EIGENVALUE(1))
        NORM = B**2 + C**2
      END IF
C
      IF (NORM .GT. 0.0) THEN
        NORM = SQRT (NORM)
        B = B / NORM
        C = C / NORM
        EIGENVECTOR(1,1) = -B
        EIGENVECTOR(2,1) =  C
        EIGENVECTOR(1,2) =  C
        EIGENVECTOR(2,2) =  B
      ELSE
C
C  If this is a trivial solution, return the identity matrix.
C
        EIGENVECTOR(1,1) = 1.0
        EIGENVECTOR(2,1) = 0.0
        EIGENVECTOR(1,2) = 0.0
        EIGENVECTOR(2,2) = 1.0
      END IF
C
      RETURN
      END
```

APPENDIX D

```
C*********************************************************************
C                                                                    *
C              RESTRICTED RIGHTS LEGEND                              *
C                                                                    *
C USE, DUPLICATION OR DISCLOSURE IS SUBJECT TO RESTRICTIONS STATED   *
C IN CONTRACT NO. DAAH01-89-C-A012-TI01 WITH TEXAS INSTRUMENTS       *
C INCORPORATED.                                                      *
C                                                                    *
C         RESTRICTED RIGHTS DATA SECTION STARTS HERE.                *
C                                                                    *
C*********************************************************************
C                                                                    *
C                     Texas Instruments                              *
C              T I   S T R I C T L Y   P R I V A T E                 *
C                Property of Texas Instruments ONLY                  *
C                                                                    *
C*********************************************************************
C
      SUBROUTINE TRKNORNG2D
C
C*********************************************************************
C
C  NAME:       TRKNORNG2D
C
C  FUNCTION:   Computes the aimpoint and trackpoint when no range
C              estimates are available. A least-squares estimator
C              calculates aimpoint and target magnification by using
C              a two-dimensional model.
C
C  DESCRIPTION:
C
C       Initialize the trackpoint measurement variances, the number of
C         good trackers, the measurement variance for one tracker, and
C         the target magnification factor
C       Set tracker confidence flags to FALSE and the breaklock flag to TRUE
C
C       Do for all trackers
C         Initialize least-squares weights for this tracker to zero
C         If a tracker is at least one cycle old Then
C           If this tracker is a 1-D tracker Then
C             Assign 1-D model matrices and observation vectors used to
C               compute least-squares target aimpoint and size estimates
C             Assign weights to inverse covariance for 1-D tracker
```

```
C              Increment the number of trackers counter
C           Else If this tracker is a 2-D tracker Then
C              Assign 2-D model matrices and observation vectors used to
C                 compute least-squares target aimpoint and size estimates
C              Assign weights to inverse covariance for 2-D tracker
C              Increment the number of trackers counter
C           End of If this tracker is a 1-D, 2-D tracker
C        End of If a tracker is at least one cycle old
C     End of Do for all trackers
C
C     If there are at least three valid tracker observations Then
C        Use least-squares to estimate aimpoint location and target size
C        If least-squares did not try to invert a singular matrix Then
C           Run the jitter test to delete trackers with bad measurements
C           Zero least-squares weights to remove bad trackers
C        End of If least-squares did not try to invert a singular matrix
C     End of If there are at least two valid trackers
C
C     If at least three valid tracker observations remain And least-squares
C           did not try to invert a singular matrix Then
C        Recompute the estimated trackpoint location and target size
C        Compute track errors and measurement variances
C        Set confidence flags to TRUE if variance thresholds not exceeded
C        Compute the aimpoint and trackpoint
C        Save and limit the estimated target sizes
C     End of If there are valid trackers and nonsingular least-squares
C
C REFERENCES:
C     The algorithm implemented by this module is described in the
C     patent application, "Tracking an Aimpoint with a Passive
C     Imaging Sensor", TI-16409.  This patent application was
C     filed with the United States Patent and Trademark Office on
C     August 29, 1991 by the law firm of Baker & Botts.
C
C-----------------------------------------------------------------------
C
C CALLING SEQUENCE:
C     CALL TRKNORNG2D
C
C INPUTS:
C     None
C
C OUTPUTS:
C     None
C
C DEPENDENCIES:
C    Common Blocks
C       PROCPARMS   - Processing parameters
C       TKPTPARMS   - Trackpoint/aimpoint related parameters
C    Subroutines
C       INTJITTER   - Integrating jitter test
C       LEASTSQ     - Weighted least-squares estimator
C
C SIDE EFFECTS:
C     None
C
C TARGET PROCESSOR:
C     VAX 8000 series VMS 4.5, Fortran Compiler 4.5-219
C
C HISTORY:
C        05/29/91   D. Van Rheeden Initial Release
C        07/02/91   D. Van Rheeden Limit minimum target sizes
C        07/29/91   D. Van Rheeden Added subpixel estimates
C        Date       Programmer     Description                   STR
C        ----       ----------     -----------                   ---
C        10/17/91   D. Van Rheeden Add 1-D tracker weight assigns 1663
C        10/17/91   D. Van Rheeden Changed SIGMA to VARIANCE      1663
C        10/17/91   D. Van Rheeden Modify least-sqrs array indexing: 1663
C                                     TRACKER      -> 2*TRACKER-1
C                                     TRACKER+MAXT -> 2*TRACKER
C        10/17/91   D. Van Rheeden Check NTRACKERS > 1 before making 1663
C                                     second call to LEASTSQ
C        10/21/91   D. Van Rheeden Change TRACKER from first to last 1663
C                                     index of INVCOV matrix
C        10/26/91   D. Van Rheeden Set track confidence flags by    1663
C                                     comparing variances with
C                                     thresholds
```

```
C         10/29/91    D. Van Rheeden  Modify INCLUDE's to make Silicon    1664
C                                       Graphics compatible
C         11/20/91    D. Van Rheeden  Modify 1-D weight assignments       1663
C         11/20/91    D. Van Rheeden  Add singular matrix check           1665
C         11/20/91    D. Van Rheeden  Initialize magnification factor     1665
C         11/22/91    D. Van Rheeden  Check # of non-zero observations    1663
C                                       instead of # of trackers
C         11/22/91    D. Van Rheeden  Separate subpixel, integer, and     1663
C                                       1-D tracking variances
C         11/25/91    D. Van Rheeden  Compute aimpoint in the boresight   1663
C                                       coordinate system
C         12/09/91    D. Van Rheeden  Added restricted rights legend      1735
C         02/03/92    D. Van Rheeden  Changed VAR_1D_EDGE from 1.0E6      1964
C                                       to 9.0
C         03/17/92    D. Van Rheeden  Add debug lines                     2020
C
C****************************************************************
C
C  Local Variables
C
C         BORESIGHT       Image boresight location
C         FACTOR          Normalized magnification factor
C         H               Least-squares model matrix
C         MAXEST          Maximum number of least-squares parameter estimates
C         MAXOBS          Maximum number of least-squares observations
C         NOBSERV         Number of nonzero observations used by least-squares
C         NTRACKERS       Number of trackers whose errors are being averaged
C         P               Least-squares estimate covariance matrix
C         PITCH,YAW       Pitch and yaw tracker mode array indexes
C         SINGULAR        Singular matrix flag
C         THRESH_MAGNIFY  Maximum variance for accurate magnification estimate
C         THRESH_PITCH    Maximum variance for confident tracking in pitch
C         THRESH_YAW      Maximum variance for confident tracking in yaw
C         TRACKER         Tracker index into data arrays
C         VAR_1D_EDGE     Tracker variance parallel to a 1-D edge (pix**2)
C         VAR_INTEGER     Tracker variance for integer measurements (pix**2)
C         VAR_SUBPIXEL    Tracker variance for subpixel measurements (pix**2)
C         W               Least-squares weighting vector
C         X,Y             Boresighted tracker location
C         XHAT            Least-squares estimate vector
C         Z               Least-squares observation vector
C         ZHAT            Least-squares estimates of tracker locations
C
C****************************************************************
C
C  Variable Delarations
C
        IMPLICIT NONE
C
        INCLUDE 'procparm.cmn'  ! Processing parameters
        INCLUDE 'tkptparm.cmn'  ! Trackpoint parameters
C
        INTEGER*4       MAXEST/3/, MAXOBS/24/, NOBSERV, NTRACKERS,
     &                  PITCH /2/, TRACKER, YAW /1/
C
        REAL*4          BORESIGHT /32.0/, FACTOR, H(24,3), P(3,3),
     &                  THRESH_MAGNIFY /2.0/,
     &                  THRESH_PITCH /1.0/, THRESH_YAW /1.0/,
     &                  VAR_1D_EDGE /9.0/, VAR_INTEGER /0.5/,
     &                  VAR_SUBPIXEL /0.25/, W(24), X, XHAT(3), Y,
     &                  Z(24), ZHAT(24)
C
        LOGICAL*4       SINGULAR
C
C****************************************************************
C                                                                *
C                       EXECUTABLE CODE                          *
C                                                                *
C****************************************************************
C
C  Initialize the trackpoint measurement variances, the number of
C  good trackers & observations, and the target magnification factor.
C
        TPVARX = 0.0
        TPVARY = 0.0
        NOBSERV = 0
        NTRACKERS = 0
```

```
              MAGNIFY = RSIZEX
C
C  Set the tracker modes to rate coast and the breaklock flag to true.
C
              TRKCONF(YAW)   = .FALSE.
              TRKCONF(PITCH) = .FALSE.
              BRKLCK = .TRUE.
C
C  For each good tracker at least one cycle old ...
C
              DO TRACKER = 1, MAXT
C
C  Initialize least-squares weights to zero.
C
                  W(2*TRACKER-1) = 0.0
                  W(2*TRACKER)   = 0.0
C
C  If this tracker is at least one cycle old ...
C
                  IF (DBASE(TRACKER,9) .GE. 1) THEN
C
C  Compute boresighted tracker location.
C
                      X = MEASX(TRACKER) - BORESIGHT
                      Y = BORESIGHT - MEASY(TRACKER)
C
C  If this is a 1-D tracker ...
C
                      IF (DBASE(TRACKER,1) .EQ. 1) THEN
C
C  Assign 1-D model matrices and observation vectors used to compute
C  least-squares target aimpoint and size estimates.
C
                          H(2*TRACKER-1,1) = EIGENVECTOR(1,1,TRACKER)
                          H(2*TRACKER-1,2) = EIGENVECTOR(2,1,TRACKER)
                          H(2*TRACKER-1,3) = DIST2DX(TRACKER)
                          H(2*TRACKER,1)   = EIGENVECTOR(1,2,TRACKER)
                          H(2*TRACKER,2)   = EIGENVECTOR(2,2,TRACKER)
                          H(2*TRACKER,3)   = DIST2DY(TRACKER)
C
                          Z(2*TRACKER-1) = EIGENVECTOR(1,1,TRACKER) * X +
     &                                     EIGENVECTOR(2,1,TRACKER) * Y
                          Z(2*TRACKER)   = EIGENVECTOR(1,2,TRACKER) * X +
     &                                     EIGENVECTOR(2,2,TRACKER) * Y
C
C  Assign 1-D least squares weights.
C
                          W(2*TRACKER-1) = 1.0 / VAR_INTEGER
                          W(2*TRACKER)   = 1.0 / VAR_1D_EDGE
C
C  Increment the number of trackers and observations counters.
C
                          NTRACKERS = NTRACKERS + 1
                          NOBSERV   = NOBSERV + 1
C
C  Else if a 2-D tracker ...
C
                      ELSE IF (DBASE(TRACKER,1) .EQ. 2) THEN
C
C  Assign 2-D model matrices and observation vectors used to compute
C  least-squares target aimpoint and size estimates.
C
                          H(2*TRACKER-1,1) = 1.0
                          H(2*TRACKER-1,2) = 0.0
                          H(2*TRACKER-1,3) = DIST2DX(TRACKER)
                          H(2*TRACKER,1)   = 0.0
                          H(2*TRACKER,2)   = 1.0
                          H(2*TRACKER,3)   = DIST2DY(TRACKER)
C
                          Z(2*TRACKER-1) = X
                          Z(2*TRACKER)   = Y
C
C  Assign 1-D least squares weights.  If the recorrelate flag is not
C  set, use subpixel variance.  Otherwise, use integer measurement variance.
C
                          IF (DBASE(TRACKER,18) .EQ. -1) THEN   ! No recorrelation
                              W(2*TRACKER-1) = 1.0 / VAR_SUBPIXEL
```

```
                W(2*TRACKER)   = 1.0 / VAR_SUBPIXEL
             ELSE   ! Recorrelation needed, but not done
                W(2*TRACKER-1) = 1.0 / VAR_INTEGER
                W(2*TRACKER)   = 1.0 / VAR_INTEGER
             END IF   ! No recorrelation
C
C  Increment the number of trackers and observations counters.
C
             NTRACKERS = NTRACKERS + 1
             NOBSERV   = NOBSERV + 2
C
          END IF ! This tracker is 1-D, 2-D
        END IF ! This tracker is at least one cycle old
      END DO ! For all good trackers
C
C  If there are at least three valid observations ...
C
      IF (NOBSERV .GE. 3) THEN
C
C  Use least-squares to estimate aimpoint location and target size.
C
         CALL LEASTSQ (H, Z, W, XHAT, ZHAT, P, MAXEST, MAXOBS,
     &                 SINGULAR)
C
C  If least-squares calculation did not try to invert a singular matrix
C     Then continue processing.
C
         IF (.NOT. SINGULAR) THEN
C
C  Run the integrating jitter test to delete trackers with bad measurements.
C
            DO TRACKER = 1, MAXT
               PREDX(TRACKER) = ZHAT(2*TRACKER-1)
               PREDY(TRACKER) = ZHAT(2*TRACKER)
            END DO
            CALL INTJITTER
C
C  Remove bad tracker measurements by setting weights to zero.
C
            NOBSERV = 0
            DO TRACKER = 1, MAXT
               IF (DBASE(TRACKER,9) .GE. 1) THEN
                  IF (DBASE(TRACKER,1) .EQ. 1) THEN   ! 1-D tracker
                     NOBSERV = NOBSERV + 1
                  ELSE IF (DBASE(TRACKER,1) .EQ. 2) THEN   ! 2-D tracker
                     NOBSERV = NOBSERV + 2
                  ELSE   ! Nonactive tracker
                     W(2*TRACKER-1) = 0.0
                     W(2*TRACKER)   = 0.0
                  END IF ! 1-D/2-D tracker
               END IF ! Tracker is old enough
            END DO ! For all trackers
C
         END IF ! Least-squares did not detect singular matrix condition
C
      END IF ! There are at least three valid observations
C
C  If at least three valid observations remain and least-squares did not try
C  to invert a singular matrix Then ...
C
      IF (NOBSERV .GE. 3 .AND. .NOT. SINGULAR) THEN
C
C  Recompute the estimated trackpoint location and target size.
C
         CALL LEASTSQ (H, Z, W, XHAT, ZHAT, P, MAXEST, MAXOBS,
     &                 SINGULAR)
C
C  If least-squares calculation did not try to invert a singular matrix
C     Then continue processing.
C
         IF (.NOT. SINGULAR) THEN
C
C  Compute track residuals and measurement variances.
C
            RESERRX = XHAT(1) + BORESIGHT - AIMX
            RESERRY = BORESIGHT - XHAT(2) - AIMY
C
```

```
              TPVARX = P(1,1)
              TPVARY = P(2,2)
              MAGVAR = P(3,3)
C
C   Set confidence flags to TRUE if variance thresholds not exceeded.
C
              TRKCONF(YAW)   = TPVARX .LE. THRESH_YAW
              TRKCONF(PITCH) = TPVARY .LE. THRESH_PITCH
              BRKLCK = .FALSE.
C
C   Compute the aimpoint and trackpoint.
C
              IF (TRKCONF(YAW))   AIMX = XHAT(1) + BORESIGHT
              IF (TRKCONF(PITCH)) AIMY = BORESIGHT - XHAT(2)
              IF (MAGVAR .LE. THRESH_MAGNIFY) THEN
                 MAGNIFY = XHAT(3)
              END IF
C
              TRACKX = AIMX + MAGNIFY * OFFSETX
              TRACKY = AIMY + MAGNIFY * OFFSETY
C
C   Compute the estimated target sizes based on magnification.  Do not
C   let target sizes become smaller than initialization sizes.
C
              FACTOR = MAGNIFY / INITSIZEX
              RSIZEX = FACTOR * INITSIZEX
              RSIZEY = FACTOR * INITSIZEY
              IF (RSIZEX .LT. INITSIZEX) RSIZEX = INITSIZEX
              IF (RSIZEY .LT. INITSIZEY) RSIZEY = INITSIZEY
C
           END IF ! Least-squares did not detect singular matrix condition
C
        END IF ! There are at least three valid tracker measurements
C
C   Write debug data.
C
D       WRITE(11,100) NINT(BIAS_INTERVAL / FRATE)
D       WRITE(11,*)
D       WRITE(11,110) NTRACKERS
D       WRITE(11,120) NOBSERV
D       WRITE(11,*)
D       WRITE(11,130)
D       WRITE(11,140) XHAT(1), XHAT(2)
D       WRITE(11,150) RSIZEX, RSIZEY
D       WRITE(11,160) SNGL(INITSIZEX), SNGL(INITSIZEY)
D       WRITE(11,*)
D       WRITE(11,170) TPVARX
D       WRITE(11,180) TPVARY
D       WRITE(11,190) MAGVAR
C
D 100   FORMAT('COMPUTE_TRACK_ERRORS.MIN_FRAMES_BETWEEN_BIASES = ',I12)
D 110   FORMAT('COMPUTE_TRACK_ERRORS.NTRACKERS = ',I12)
D 120   FORMAT('COMPUTE_TRACK_ERRORS.NOBSERV   = ',I12)
D 130   FORMAT('                                  YAW         PITCH')
D 140   FORMAT('AIMPOINT            ',2F12.5)
D 150   FORMAT('TARGET_SIZE         ',2F12.5)
D 160   FORMAT('INIT_TARGET_SIZE    ',2F12.5)
D 170   FORMAT('VARIANCE(YAW_DIM)   = ',F12.5)
D 180   FORMAT('VARIANCE(PITCH_DIM) = ',F12.5)
D 190   FORMAT('VARIANCE(SIZE_DIM)  = ',F12.5)
C
        RETURN
        END
```

APPENDIX E

```
C************************************************************
C                                                            *
C                 RESTRICTED RIGHTS LEGEND                   *
C                                                            *
C  USE, DUPLICATION OR DISCLOSURE IS SUBJECT TO RESTRICTIONS STATED *
C  IN CONTRACT NO. DAAH01-89-C-A012-TI01 WITH TEXAS INSTRUMENTS    *
C  INCORPORATED.                                             *
C                                                            *
C           RESTRICTED RIGHTS DATA SECTION STARTS HERE.      *
C                                                            *
C************************************************************
C                                                            *
C                    Texas Instruments                       *
C              T I  S T R I C T L Y  P R I V A T E           *
C              Property of Texas Instruments ONLY            *
C                                                            *
C************************************************************
C
       SUBROUTINE INTJITTER
C
C************************************************************
C
C   NAME:        INTJITTER
C
C   FUNCTION:    Performs the integrating robust jitter test for the
C                2-D range independent tracking model.
C
C   DESCRIPTION:
C        Initialize the number of trackers and residual samples to zero
C        For each tracker Do
C          If tracker is 1-D and at least one cycle old Then
C             Increment the number of trackers counter
C             Increment the number of residual samples by 1
C             Compute error between measured and predicted tracker location
C                along the eigenvector of the maximum eigenvalue
C             Save the error in a temporary vector
C          Else if tracker is 2-D and at least one cycle old Then
C             Increment the number of trackers counter
C             Increment the number of residual samples by 2
C             Compute errors between measured and predicted tracker locations
C             Save the errors in a temporary vector
C          End of if tracker is 1-D, 2-D and at least one cycle old
C        End of loop for each tracker
C
C        If at least 3 trackers are present then
C           Compute the median of the error values
C           Compute the median absolute deviation of the error values
C           For each good tracker at least one cycle old
C              If 1-D tracker Then
C                 X jitter value = ((Difference - Median) / MAD)**2
C                 Y jitter value = 0
C              Else if 2-D tracker Then
C                 X jitter value = ((X difference - Median) / MAD)**2
C                 Y jitter value = ((Y difference - Median) / MAD)**2
C              End of If 1-D, 2-D tracker
C              If the either jitter value > threshold then
C                 Execute routine to delete the tracker
C                 Set the appropriate reason for deletion flag to true
C              End of if either jitter value > threshold
C           End of loop for each good tracker at least one cycle old
C        End of if at least 3 trackers are present
C
C   REFERENCES:
C        The algorithm implemented by this module is described in the
C        patent application, "Method and Apparatus for Rejecting
C        Aimpoint Subimages", TI-16505. This patent application was
C        filed with the United States Patent and Trademark Office on
C        August 29, 1991 by the law firm of Baker & Botts.
C
C------------------------------------------------------------
C
C   CALLING SEQUENCE:
C        CALL INTJITTER
C
C   INPUTS:
C        None
C
```

```
C  OUTPUTS:
C       None
C
C  DEPENDENCIES:
C     Common Blocks
C        PROCPARMS - Processing parameters
C        TKPTPARMS - Trackpoint parameters
C     Functions
C        MEDIAN    - Calculates median of a vector of samples
C
C  SIDE EFFECTS:
C       None
C
C  TARGET PROCESSOR:
C       VAX 8000 series VMS 4.5, Fortran Compiler 4.5-219
C
C  HISTORY:
C       06/20/91   D. Van Rheeden Initial Release
C         Date       Programmer      Description                STR
C         ----       ----------      -----------                ---
C       10/17/91   D. Van Rheeden Limit jitter values in DBASE array
C       10/29/91   D. Van Rheeden Modify INCLUDE's to make Silicon  1664
C                                    Graphics compatible
C       11/04/91   D. Van Rheeden Check tracker dimension and age  1663
C                                    to determine if a tracker is
C                                    good
C       11/25/91   D. Van Rheeden Do jitter test in boresighted    1663
C                                    coordinates
C       12/05/91   D. Van Rheeden Use floating point measurements, 1665
C                                    MEASX and MEASY
C       12/09/91   D. Van Rheeden Added restricted rights legend   1735
C       01/15/92   D. Van Rheeden Use 1-D tracker measurements     1964
C
C****************************************************************
C
C  Local Variables
C
C       BORESIGHT         Image boresight location
C       DIFF              Differences between the found and predicted locations
C       ERROR             Vertical and horizontal errors of good trackers only
C       JITRX, JITRY      Vertical and horizontal jitter scores
C       MAD_ERROR         Median absolute deviation of track errors
C       MEDIAN_ERROR      Median of track errors
C       MINMAD            Minimum allowed median absolute deviation
C       NTRACKERS         Number of good trackers
C       NSAMPLES          Number of samples to compute median/MAD
C       THRESH            Threshold for the jitter test
C       TRKR              Tracker index (position in the database)
C       X,Y               Boresighted tracker location
C
C****************************************************************
C
C  Variable Delarations
C
        IMPLICIT NONE
C
        INCLUDE 'procparm.cmn'  ! Processing parameters
        INCLUDE 'tkptparm.cmn'  ! Trackpoint parameters
C
        INTEGER*4     NSAMPLES, NTRACKERS, TRKR
C
        REAL*4        BORESIGHT /32.0/, DIFF(24), ERROR(24),
     &                JITRX, JITRY, MAD_ERROR, MEDIAN,
     &                MEDIAN_ERROR, MINMAD /0.5/, X, Y
C
        REAL*4        THRESH(24) / 0.0,  0.0, 18.5, 20.6, 21.2, 16.3,
     &                            13.7, 12.3, 12.3, 12.3, 12.3, 12.3,
     &                            12.3, 12.3, 12.3, 12.3, 12.3, 12.3,
     &                            12.3, 12.3, 12.3, 12.3, 12.3, 12.3 /
C
        EXTERNAL      MEDIAN
C
C****************************************************************
C                                                                *
C                       EXECUTABLE CODE                          *
C                                                                *
C****************************************************************
```

```
C
C  Count the number of good trackers and compute the differences between
C  the predicted and the found locations.
C
        NTRACKERS = 0
        NSAMPLES = 0
        DO TRKR = 1, MAXT
C
C  Compute error for an active 1-D tracker.  The error is computed along
C  the eigenvector of the maximum correlation surface eigenvalue.
C
          IF (DBASE(TRKR,1) .EQ. 1 .AND. DBASE(TRKR,9) .GT. 0) THEN
            NTRACKERS = NTRACKERS + 1
            NSAMPLES = NSAMPLES + 1
            X = MEASX(TRKR) - BORESIGHT
            Y = BORESIGHT - MEASY(TRKR)
            X = EIGENVECTOR(1,1,TRKR) * X + EIGENVECTOR(2,1,TRKR) * Y
            DIFF(2*TRKR-1) = X - PREDX(TRKR)
            ERROR(NSAMPLES) = DIFF(2*TRKR-1)
C
C  Compute errors for an active 2-D tracker.
C
          ELSE IF (DBASE(TRKR,1) .EQ. 2 .AND. DBASE(TRKR,9) .GT. 0) THEN
            NTRACKERS = NTRACKERS + 1
            NSAMPLES = NSAMPLES + 2
            X = MEASX(TRKR) - BORESIGHT
            Y = BORESIGHT - MEASY(TRKR)
            DIFF(2*TRKR-1) = X - PREDX(TRKR)
            DIFF(2*TRKR)   = Y - PREDY(TRKR)
            ERROR(NSAMPLES-1) = DIFF(2*TRKR-1)
            ERROR(NSAMPLES)   = DIFF(2*TRKR)
          END IF  ! Active 1-D, 2-D trackers
        END DO  ! For all trackers C  If there are at least three good trackers Then do the jitter test.
C
        IF (NTRACKERS .GE. 3) THEN
C
C  Compute the jitter median.
C
          MEDIAN_ERROR = MEDIAN (ERROR, NSAMPLES)
C
C  Compute the jitter median absolute deviation (MAD).
C
          NSAMPLES = 0
          DO TRKR = 1, MAXT
            IF (DBASE(TRKR,1) .EQ. 1 .AND.
     &          DBASE(TRKR,9) .GT. 0) THEN   ! Active 1-D Tracker
              NSAMPLES = NSAMPLES + 1
              ERROR(NSAMPLES) = ABS (DIFF(2*TRKR-1) - MEDIAN_ERROR)
            ELSE IF (DBASE(TRKR,1) .EQ. 2 .AND.
     &               DBASE(TRKR,9) .GT. 0) THEN   ! Active 2-D Tracker
              NSAMPLES = NSAMPLES + 2
              ERROR(NSAMPLES-1) = ABS (DIFF(2*TRKR-1) - MEDIAN_ERROR)
              ERROR(NSAMPLES)   = ABS (DIFF(2*TRKR)   - MEDIAN_ERROR)
            END IF  ! Active 1-D, 2-D tracker
          END DO  ! For all trackers
C
          MAD_ERROR = MAX ((MEDIAN (ERROR, NSAMPLES) / 0.6745), MINMAD)
C
C  For each good tracker compute the jitter test scores.
C
          DO TRKR = 1, MAXT
            IF (DBASE(TRKR,1) .GE. 1 .AND. DBASE(TRKR,9) .GT. 0) THEN
C
              IF (DBASE(TRKR,1) .EQ. 1) THEN  ! 1-D Tracker
                JITRX = ((DIFF(2*TRKR-1) - MEDIAN_ERROR) / MAD_ERROR)**2
                JITRY = 0.0
              ELSE IF (DBASE(TRKR,1) .EQ. 2) THEN  ! 2-D Tracker
                JITRX = ((DIFF(2*TRKR-1) - MEDIAN_ERROR) / MAD_ERROR)**2
                JITRY = ((DIFF(2*TRKR)   - MEDIAN_ERROR) / MAD_ERROR)**2
              END IF ! 1-D, 2-D tracker
C
D             WRITE (TRLUN(TRKR), *)
D             WRITE (TRLUN(TRKR), 10) 'JITRX =', JITRX, 'JITRY =', JITRY
D  10         FORMAT(2(5X,A7,F6.2))
C
```

```
C If the jitter scores fail, delete the tracker from the database and set the
C reason flag.  Scale the jitter values to save in integer database.
C
            IF (JITRX .GT. THRESH(NSAMPLES) .OR.
     &          JITRY .GT. THRESH(NSAMPLES)) THEN
              CALL DBDEL(TRKR)
              REASONS(2,TRKR) = .TRUE.
            END IF  ! jitter test fails
C
            DBASE(TRKR,14) = MIN (NINT(100 * JITRX), 32767)
            DBASE(TRKR,15) = MIN (NINT(100 * JITRY), 32767)
C
          END IF   ! good tracker
C
        END DO  ! trkr = 1 to maxt
C
C Else, if not enough trackers, set the jitter values to zero
C
        ELSE
          DO TRKR = 1, MAXT
            IF (DBASE(TRKR,1) .GE. 1) THEN
              DBASE(TRKR,14) = 0
              DBASE(TRKR,15) = 0
D             WRITE (TRLUN(TRKR), *)
D             WRITE (TRLUN(TRKR), *) '    JITRX =  0.0    JITRY =  0.0'
            END IF  ! existing tracker
          END DO  ! i = 1, maxt
C
        END IF  ! ntrackers >= 3
C
        RETURN
        END
```

APPENDIX F

```
C*****************************************************************
C                                                                *
C              RESTRICTED RIGHTS LEGEND                          *
C                                                                *
C USE, DUPLICATION OR DISCLOSURE IS SUBJECT TO RESTRICTIONS STATED *
C IN CONTRACT NO. DAAH01-89-C-A012-TI01 WITH TEXAS INSTRUMENTS   *
C INCORPORATED.                                                  *
C                                                                *
C           RESTRICTED RIGHTS DATA SECTION STARTS HERE.          *
C                                                                *
C*****************************************************************
C                                                                *
C                    Texas Instruments                           *
C                   T I  I N T E R N A L  D A T A                *
C              Property of Texas Instruments ONLY                *
C                                                                *
C*****************************************************************
C
        SUBROUTINE LEASTSQ (H, Z, W, XHAT, ZHAT, P, NEST, NOBS,
     &                       SINGULAR)
C
C*****************************************************************
C
C NAME:       LEASTSQ
C
C FUNCTION:   Weighted least-squares estimator. The estimator uses
C             the standard form:
C
C                  ^        T       -1    T
C                  x = (H * W * H)    * H * W * z
C
C             where
C                  ^
C                  x = vector of least-squares estimates
C                  z = vector of input observations
C                  H = least-squares model matrix
C                  W = weighting matrix
C
```

```
C              The predicted observations are computed by:
C
C                         ^         ^
C                         z = H * x
C
C DESCRIPTION:
C                      T
C      Compute the matrix product HW = H  * W
C      Compute the matrix product HW * H and invert the result
C      Save the least-squares estimate covariance matrix
C      If Ht * W * H is not singular Then
C         Compute the least-squares pseudo-inverse matrix
C         Compute the least-squares estimates
C         Compute the observation estimates
C      End of If Ht * W * H is not singular
C
C REFERENCES:
C      Elbert, T. F., Estimation and Control of Systems, Van Nostrand
C      Reinhold Co., 1984, pp. 367-369.
C
C-----------------------------------------------------------------------
C
C CALLING SEQUENCE:
C      CALL LEASTSQ (H, Z, W, XHAT, ZHAT, P, NEST, NOBS, SINGULAR)
C
C INPUTS:
C      H         - Least-squares model matrix
C      NEST      - Number of least-squares estimates to compute
C      NOBS      - Number of least-squares observations to compute
C      W         - Weight vector
C      Z         - Vector of observations
C
C OUTPUTS:
C      P         - Least-squares estimate normalized covariance matrix
C      SINGULAR  - Singular matrix flag
C      XHAT      - Vector of least-squares estimates
C      ZHAT      - Vector of predicted observations
C
C DEPENDENCIES:
C   Subroutines
C      MATINV   - Inverts a matrix
C      MATMULT  - Multiplies two matrices
C      MATTRAN  - Transposes a matrix
C      MVMULT   - Multiplies a matrix by a column vector
C
C SIDE EFFECTS:
C      If the number of estimates or the number of observations become
C      larger than the local matrix dimensions, then the local matrix
C      dimensions must be increased.
C
C TARGET PROCESSOR:
C      VAX 8000 series VMS 4.5, Fortran Compiler 4.5-219
C
C HISTORY:
C      05/30/91   D. Van Rheeden Initial Release
C      Date       Programmer     Description                    STR
C      ----       ----------     -----------                    ---
C      10/17/91   D. Van Rheeden Changed W from NOBSx1 vector to  1663
C                                NOBSx2 matrix to handle
C                                1-D trackers
C      10/29/91   D. Van Rheeden Remove unnecessary INCLUDE       1664
C      11/12/91   D. Van Rheeden Corrected z_hat calculation
C      11/20/91   D. Van Rheeden Changed W to NOBSx1 vector to    1663
C                                handle new 1-D tracker calcs
C      11/20/91   D. Van Rheeden Put in check to prevent inversion 1665
C                                of singular matrices
C      12/09/91   D. Van Rheeden Added restricted rights legend   1735
C
C***********************************************************************
C
C  Local Variables
C
C      I, J, K, L    Matrix loop indexes
C      HTW           Product of transposed model matrix and weights
C      HTWHINV       Inverse of the product HTW * H
C      OBS           Observation estimate model matrix
C      PSINV         Least-squares pseudo-inverse matrix
C
C***********************************************************************
```

```
C
C  Variable Delarations
C
       IMPLICIT NONE
C
       INTEGER*4      I, J, K, L, NEST, NOBS
C
       REAL*4         H(NOBS,NEST), HTW(3,24), HTWH(3,3),
     &                OBS(24,24), P(NEST,NEST), PSINV(3,24),
     &                TEMP(3,3), W(NOBS), XHAT(NEST),
     &                Z(NOBS), ZHAT(NOBS)
C
       LOGICAL*4      SINGULAR
C
C***********************************************************************
C                                                                      *
C                                                                      *
C                        EXECUTABLE CODE                               *
C                                                                      *
C                                                                      *
C***********************************************************************
C
C                            T
C  Compute the matrix product HW = H  * W.  Note that W is input as an
C  NOBSx1 vector instead of an NOBSxNOBS matrix to reduce the number of
C  computations.
C
       CALL MATTRAN (H, HTW, NOBS, NEST)
       DO I = 1, NEST
         DO J = 1, NOBS/2
           K = 2 * J - 1
           L = 2 * J
           HTW(I,K) = HTW(I,K) * W(K)
           HTW(I,L) = HTW(I,L) * W(L)
         END DO
       END DO
C                            T
C  Compute the matrix product H  * W * H and invert.  Save the result as
C  the normalized covariance matrix of the least-squares estimates.
C
       CALL MATMULT (HTW, H, HTWH, NEST, NOBS, NOBS, NEST)
       CALL MATINV (HTWH, P, TEMP, NEST, NEST, SINGULAR)
C        T
C  If H * W * H is not singular, then continue ...
C
       IF (.NOT. SINGULAR) THEN
C
C  Compute the least-squares pseudo-inverse matrix.
C
         CALL MATMULT (P, HTW, PSINV, NEST, NEST, NEST, NOBS)
C
C  Compute the least-squares estimates, x.
C
         CALL MVMULT (PSINV, Z, XHAT, NEST, NOBS, NOBS)
C
C  Compute the observation estimates, z.
C
         CALL MVMULT (H, XHAT, ZHAT, NOBS, NEST, NEST)
C
       END IF ! Ht * W * H is not singular
C
       RETURN
       END
```

APPENDIX G

```
C***********************************************************************
C                                                                      *
C                      RESTRICTED RIGHTS LEGEND                        *
C                                                                      *
C  USE, DUPLICATION OR DISCLOSURE IS SUBJECT TO RESTRICTIONS STATED    *
C  IN CONTRACT NO. DAAH01-89-C-A012-TI01 WITH TEXAS INSTRUMENTS        *
C  INCORPORATED.                                                       *
C                                                                      *
C            RESTRICTED RIGHTS DATA SECTION STARTS HERE.               *
C                                                                      *
C***********************************************************************
```

```
C                                                                *
C                         Texas Instruments                      *
C                     T I  I N T E R N A L  D A T A              *
C                  Property of Texas Instruments ONLY            *
C                                                                *
C****************************************************************
C
C   COMMON BLOCK PROCPARM
C
C****************************************************************
C
C   MNEUMONIC:   PROCessing PARaMeters common block
C
C   AUTHOR:      Roger Broussard
C
C   HISTORY:
C        10/31/88   R. Broussard     Generated from program TRACK written
C                                    by Cam Kaszas for AGB program
C        01/09/90   D. Van Rheeden   Added variables to run AAWS-M images
C        04/11/91   D. Van Rheeden   Removed boresight jitter: XTRAN, YTRAN
C        04/15/91   D. Van Rheeden   Added image dimensions: IMGROWS, IMGCOLS
C        04/17/91   D. Van Rheeden   Added max limits: MAXACF, MAXCONT
C        04/22/91   D. Van Rheeden   Added screen limits: MINX,Y and MAXX,Y
C        05/20/91   D. Van Rheeden   Added CONTTH_MIN; removed HSKIP, VSKIP
C        05/24/91   D. Van Rheeden   Added trackability/update to REASONS
C        05/24/91   D. Van Rheeden   Added reference update age threshold
C        05/28/91   D. Van Rheeden   Added real target sizes, RSIZEX,Y
C        06/13/91   D. Van Rheeden   Added line of sight angles, LOSP,Y
C        06/17/91   D. Van Rheeden   Replaced IRRES with RAD_TO_PIX, PIX_TO_RAD
C        06/17/91   D. Van Rheeden   Added last frame X,Y coordinates to DBASE
C        10/07/91   D. Van Rheeden   Added MINSNR
C        Date       Programmer       Description                  STR
C        ----       ----------       -----------                  ---
C        10/16/91   D. Van Rheeden   Add 1-D correlator DBASE status     1663
C        10/17/91   D. Van Rheeden   Add 1-D correlator sharpness        1663
C                                    threshold, SRTH1D
C        10/29/91   D. Van Rheeden   Change INTEGER*2 to INTEGER*4       1664
C                                    and LOGICAL*2 to LOGICAL*4 to
C                                    prevent Silicon Graphics common
C                                    block alignment problems
C        11/13/91   D. Van Rheeden   Add MAX_UPDATES, MAX_RECORRELATES   1665
C        11/18/91   D. Van Rheeden   Add recorrelate flag to DBASE       1665
C        12/05/91   D. Van Rheeden   Add MEASX,Y and OLDX,Y              1665
C        12/09/91   D. Van Rheeden   Add restricted rights legend        1735
C        02/17/92   D. Van Rheeden   Add reference update test type to   2020
C                                    the DBASE array
C
C****************************************************************
C                       VARIABLE DECLARATIONS
C****************************************************************
C
           COMMON /PROCPARMS/    ACOR, AGETH, AIMX, AIMY, ALTITUDE,
     &                           APMODE, BRKLCK, CCOR, CFT, CHECKS, COLOR,
     &                           CONT, CONTTH, CONTTH_MIN, CYCLE, DBASE,
     &                           DCHISL, DCHISU, DCREFX, DCREFY, DCSERX,
     &                           DCSERY, DRANGE, FRATE,
     &                           HGREFX, HGREFY, IMGCOLS, IMGGAIN,
     &                           IMGROWS, LOSP, LOSY, LOSRP, LOSRY,
     &                           LUNN, MAXACF, MAXCONT, MAXP,
     &                           MAX_RECORRELATES, MAXT, MAX_UPDATES,
     &                           MAXX, MAXY, MEASX, MEASY, MINSNR,
     &                           MINX, MINY, NZSIGMA, OLDRNG, OLDX, OLDY,
     &                           PIX_TO_RAD, PREDX, PREDY, RAD_TO_PIX,
     &                           RANGE, RANGE_GOOD, REASONS,
     &                           RESERRX, RESERRY, RSIZEX, RSIZEY,
     &                           SR, SRTH, SRTH1D, TGTSZX, TGTSZY, TPVARX,
     &                           TPVARY, TRACKX, TRACKY, TRLUN, VELOCITY
C
           INTEGER*4       AGETH, CHECKS, CONT, CONTTH, CONTTH_MIN, CYCLE,
     &                     DBASE(12,19), DCHISL, DCHISU, DCREFX, DCREFY,
     &                     DCSERX, DCSERY, HGREFX, HGREFY, IMGCOLS,
     &                     IMGROWS, LUNN, MAXACF, MAXCONT, MAXP,
     &                     MAX_RECORRELATES, MAXT, MAX_UPDATES,
     &                     MAXX, MAXY, MINX, MINY, SR, SRTH, SRTH1D,
     &                     TRLUN(12)
C
           INTEGER*4       ACOR(25,25), APMODE, CCOR(25,25), COLOR(12)
C
```

```
          REAL*4        AIMX, AIMY, ALTITUDE, DRANGE, FRATE, IMGGAIN,
        &               LOSP, LOSY, LOSRP, LOSRY, MEASX(12), MEASY(12),
        &               MINSNR, NZSIGMA, OLDRNG, OLDX(12), OLDY(12),
        &               PIX_TO_RAD, PREDX(12), PREDY(12),
        &               RAD_TO_PIX, RANGE, RESERRX, RESERRY, RSIZEX,
        &               RSIZEY, SUMP, SUMY, TGTSZX, TGTSZY, TPVARX,
        &               TPVARY, TRACKX, TRACKY, VELOCITY
C
          LOGICAL*4     BRKLCK, CFT, RANGE_GOOD, REASONS(4,12)
C
C*****************************************************************
C                          VARIABLE DESCRIPTIONS
C*****************************************************************
C
C     ACOR, CCOR        Auto-correlation and cross-correlation matrices
C     AGETH             Reference update tracker age threshold
C     AIMX, AIMY        Horizontal and vertical position of the aimpoint
C                       (0.0,0.0 in upper left)
C     APMODE            Autopilot mode
C     ALTITUDE          Altitude of the platform (meters)
C     BRKLCK            Breaklock flag (no good trackers in database)
C     CHECKS            Total number of checks allowed this cycle
C     CFT               Captive flight test indicator
C     COLOR             The color index used to identify trackers
C     CONT, SR          Current local contrast and sharpness ratio scores
C     CONTTH, SRTH      Local contrast and sharpness ratio thresholds
C     CONTTH_MIN        Minimum allowed local contrast threshold
C     CYCLE             Track cycle number, 0 = Initialization cycle
C     DBASE(j,k)        Tracker data base
C                       DBASE(j,1):   -1 ==> slot free
C                                      1 ==> slot full (1-D tracker)
C                                      2 ==> slot full (2-D tracker)
C                       DBASE(j,2):   X coordinate for tracker j
C                       DBASE(j,3):   Y coordinate for tracker j
C                       DBASE(j,4):   Local contrast score
C                       DBASE(j,5):   Sharpness ratio score
C                       DBASE(j,6):   Zone number
C                       DBASE(j,7):   -1 ==> outside OSB (needs replacement)
C                                      2 ==> in bounds
C                       DBASE(j,8):   Reference update threshold
C                       DBASE(j,9):   Cycles active
C                       DBASE(j,10):  Cross correlation score at best match
C                       DBASE(j,11):  X predicted position
C                       DBASE(j,12):  Y predicted position
C                       DBASE(j,13):  Reference update flag:
C                                     -1 ==> reset
C                                      2 ==> set (perform reference update)
C                       DBASE(j,14):  Jitter test X score
C                       DBASE(j,15):  Jitter test Y score
C                       DBASE(j,16):  X coordinate from last frame
C                       DBASE(j,17):  Y coordinate from last frame
C                       DBASE(j,18):  Recorrelate flag:
C                                     -1 ==> recorrelate not required
C                                      2 ==> recorrelate required
C                       DBASE(j,19):  Reference update test type:
C                                      1 ==> update by tracker age
C                                      2 ==> update by range magnification
C     DCHISL, DCHISU    Lower and uppper thresholds for the local contrast
C                       histogram computation
C     DCREFX, DCREFY    Horizontal and vertical size of the reference array
C     DCSERX, DCSERY    Horizontal and vertical size of the search array
C     DRANGE            Change in slant range between each image (meters/frame)
C     FRATE             Frame rate (seconds/frame)
C     HGREFX, HGREFY    Horizontal and vertical size of the reference area used
C                       to compute the local contrast
C     IMGCOLS, IMGROWS  Image horizontal and vertical dimensions
C     IMGGAIN           Image global gain
C     LOSP, LOSY        Pitch/Yaw line-of-sight angles (radians)
C     LOSRP, LOSRY      Pitch/Yaw line-of-sight rates (radians/sec)
C     LUNN              Logical unit number counter for tracker output
C     MAXACF            Maximum number of autocorrelation function shape tests
C     MAXCONT           Maximum number of local contrast tests
C     MAXP              Number of parameters per tracker ( ==>DBASE(i,MAXP))
C     MAX_RECORRELATES  Maximum number of recorrelations allowed per frame
C     MAXT              Maximum number of trackers allowed ( ==>DBASE(MAXT,j))
C     MAX_UPDATES       Maximum number of reference updates per frame
C     MAXX, MAXY        Maximum horizontal and vertical search area boundaries
```

```
C      MEASX, MEASY    Floating point tracker measurements
C      MINSNR          Minumum local contrast test signal-to-noise ratio
C      MINX, MINY      Minimum horizontal and vertical search area boundaries
C      NZSIGMA         Standard deviation of the image noise
C      OLDRNG          Previous target range
C      OLDX, OLDY      Previous frame floating point tracker measurements
C      PIX_TO_RAD      Pixels to radians conversion factor
C      PREDX, PREDY    Floating point values for predicted tracker locations
C      RAD_TO_PIX      Radians to pixels conversion factor
C      RANGE           Slant range (meters)
C      RANGE_GOOD      Range good indicator
C      REASONS         Reason flags for why tracker was deleted or updated:
C                      REASONS(1,x) - Tracker is out-of-bounds,
C                      REASONS(2,x) - Tracker failed jitter test
C                      REASONS(3,x) - Tracker failed trackability tests
C                      REASONS(4,x) - Tracker reference update occurred
C      RESERRX,RESERRY Correlation residual error (pixels)
C      RSIZEX, RSIZEY  Real-valued target size for limiting subimage search
C      SRTH1D          1-D tracker sharpness ratio threshold
C      SUMP, SUMY      Pitch/Yaw integrated line-of-sight (radians)
C      TGTSZX, TGTSZY  Target size for limiting subimage search region
C      TPVARX, TPVARY  Trackpoint measurement variance ;
C      TRACKX, TRACKY  Horizontal and vertical position of the trackpoint
C                      (0.0,0.0 in upper left)
C      TRLUN           Logical unit numbers for the existing trackers
C      VELOCITY        Velocity of the platform (meters/second)
C
C*****************************************************************
```

APPENDIX H

```
C
C_____
C                       Texas Instruments
C                       TI INTERNAL DATA
C                  Property of Texas Instruments ONLY
C_____
C
C      SUBROUTINE DBDEL (TRACKER)
C
C      NAME:      DBDEL
C
C      FUNCTION:  Deletes a tracker from the database
C
C      DESCRIPTION:
C      Set the values of the tracker location to -1
C      Compute the location of the reference subimage in B memory
C      Clear the region of B memory used for the reference subimage
C
C      REFERENCES:
C      None
C
C      CALLING SEQUENCE:
C          Call DBDEL (TRACKER)
C
C      INPUTS:
C          TRACKER - Index of tracker to delete
C
C      OUTPUTS:
C          None
C
C      DEPENDENCIES:
C          Common Blocks
C              ASPMEMYS - APAP A and B memories
```

```
C            PROCPARMS - Processing parameters
C
C      SIDE EFFECTS:
C            None
C
C      TARGET PROCESSOR:
C            VAX 8000 series VMS 4.5, Fortran Compiler 4.5 -219
C
C      HISTORY:
C            11/08/88   R. Broussard     Initial Release
C                 Local Variables
C            I,J      Loop counters
C            MXSTRT   Starting column of reference subimage in B memory
C            MYSTRT   Starting row of reference subimage in B memory
C
C      Variable Declarations
C
       IMPLICIT NONE
C
       INCLUDE 'COMMON: APMEMY. CMN!'  APAP A and B memories
       INCLUDE 'COMMON:PROGPARM. CMN!'  Processing parameters
C
       INTEGER*2    I, J, MXSTRT, MYSTRT, TRACKER
C
C
C_____
C                     EXECUTABLE CODE
C_____
C
C   Set the tracker indicator in the database to indicate available.
C
       DBASE( TRACKER,1) = -1
C
C   Determine the location of the tracker in B memory.
C
       MXSTRT = MOD( TRACKER-1, 8) *16 +1
       MYSTRT = (( TRACKER-1)/8 * 16 +1
C   Erase reference image and label from B memory.
C
       DO J = 1, 16
         DO I = 1, 16
           DMEMYB( MXSTRT+I-1, MYSTRT+J-1) = 0
         END DO
       END DO
C
C   For Debugging ...
C
D        CLOSE( UNIT=TRLUN( TRACKER))
C

RETURN
       END
```

```
C
C
C                         Texas Instruments
C                         TI INTERNAL DATA
C                   Property of Texas Instruments ONLY
C
C
C
C         REAL*4 FUNCTION MEDIAN (VECTOR, NSAMPLES)
C
C
C
C     NAME:    MEDIAN
C
C     FUNCTION:   Computes the median of a vector of numbers.
C
C     DESCRIPTION:
C         Sort the input vector from smallest to largest
C         If the number of input samples is even Then
C            Median = average of two middle samples
C         Else the number of input samples is odd
C            Median = middle sample
C         End If
C
C     REFERENCES:
C         None
C
C
C     CALLING SEQUENCE:
C         MEDIAN_VALUE = MEDIAN (VECTOR, NSAMPLES)
C
C     INPUTS:
C         VECTOR   - Input vector containing samples to process
C         NSAMPLES - Number of samples in VECTOR
C
C     OUTPUTS:
C         MEDIAN - Output median value
C
C     DEPENDENCIES:
C         None
C
C     SIDE EFFECTS:
C         None
C
C     TARGET PROCESSOR:
C         VAX 8000 series VMS 4.5, Fortran Compiler 4.5-219
C
C     HISTORY:
C         01/28/91    D. Van Rheeden  Initial Release
C         06/20/91    D. Van Rheeden  Reduced outer sorting loop from N-1
C                                     samples to N/2+1 samples
C
C
C     Local Variables
C
C         I, J       Sorting loop counters
C         MIDDLE     Address of middle value in the sorted input vector
C         TEMP       Temporary storage used by sorting loops
C
C
```

```
C
C      Variable Declarations
C
       IMPLICIT NONE
C
       INTEGER*2  I, J, MIDDLE, NSAMPLES
C
       REAL*4     TEMP, VECTOR (NSAMPLES)
C
C_____
C
C                        EXECUTABLE CODE
C
C_____
C
C      Sort the input vector from smallest to largest values.
C
       DO I = 1,NSAMPLES/2+1
         DO J = 2,NSAMPLES
           IF ( VECTOR(J) .LT. VECTOR(J-1) ) THEN
             TEMP = VECTOR(J-1)
             VECTOR(J-1) = VECTOR(J)
             VECTOR(J) = TEMP
           END IF
         END DO
       END DO
C
C      Compute the median.  If the number of input samples is even, the
C      median is the average of the two middle samples.  If the number of
C      samples is odd, the median is the middle sample.
C
       IF (MOD(NSAMPLES,2) .EQ. 0) THEN
         MIDDLE = NSAMPLES/2
         MEDIAN = (VECTOR(MIDDLE) + VECTOR(MIDDLE+1)) / 2.0
       ELSE
         MIDDLE = NSAMPLES/2 + 1
         MEDIAN = VECTOR(MIDDLE)
       END IF
C
       RETURN
       END
C_____
C
C                         Texas Instruments
C                         TI INTERNAL DATA
C                    Property of Texas Instruments ONLY
C
C_____
C
       SUBROUTINE MATADD ( M1, M2, SUM, ROWS, COLS )
C
C_____
C
C      NAME:       MATADD
C
C      FUNCTION:   Adds two matrices.
C
C      DESCRIPTION:
C            Sum = matrix #1 + matrix #2.
C
C      REFERENCES:
C
C_____
```

```
C
C       CALLING SEQUENCE:
C           CALL MATADD ( M1, M2, SUM, ROWS, COLS )
C
C       INPUTS:
C           M1, M2      - Input matrices
C           ROWS, COLS  - Matrix dimensions
C
C       OUTPUTS:
C           SUM - Output matrix sum
C
C       DEPENDENCIES:
C           None
C
C       TARGET PROCESSOR:
C           VAX 8000 series VMS 4.5, Fortran Compiler 4.5-219
C
C       HISTORY:
C           02/18/91        D. Van Rheeden   Initial Release
C
C_____
C
C       Local Variables
C
C           I, J    Matrix indexes
C
C_____
C
C       Variable Declarations
C
        IMPLICIT NONE
C
        INTEGER*2   COLS, I, J, ROWS
C
        REAL*4      M1(ROWS,COLS), M2(ROWS,COLS),
     &              SUM(ROWS,COLS)
C
C_____
C
C                   EXECUTABLE CODE
C
C_____
C
C       Add the two input matrices.
C
        DO I = 1, ROWS
          DO J = 1, COLS
            SUM(I,J) = M1(I,J) + M2(I,J)
          END DO
        END DO
C
        RETURN
        END
C
C
C_____
C
        SUBROUTINE MATSUB ( M1, M2, DIFF, ROWS, COLS )
C
C_____
C
C       NAME:   MATSUB
```

```
C
C      FUNCTION:    Subtracts two matrices.
C
C      DESCRIPTION:
C          Difference = matrix #1 - matrix #2.
C
C      REFERENCES:
C
C_____
C
C      CALLING SEQUENCE:
C          CALL MATSUB ( M1, M2, DIFF, ROWS, COLS )
C
C      INPUTS:
C          M1, M2  -    Input matrices
C          ROWS, COLS -  Matrix dimensions
C
C      OUTPUTS:
C          DIFF - Output matrix difference
C
C      DEPENDENCIES:
C          None
C
C      SIDE EFFECTS:
C          None
C
C      TARGET PROCESSOR:
C          VAX 8000 series VMS 4.5, Fortran Compiler 4.5-219
C
C      HISTORY:
C          02/18/91      D. Van Rheeden  Initial Release
C
C_____
C
C      Local Variables
C
C          I, J    Matrix indexes
C
C_____
C
C      Variable Declarations
C
       IMPLICIT NONE
C
       INTEGER*2    COLS, I, J, ROWS
C
       REAL*4       M1(ROWS,COLS), M2(ROWS,COLS), DIFF(ROWS,COLS)
C
C_____
C
C                     EXECUTABLE CODE
C
C_____
C
C      Subtract the two input matrices.
C
       DO I = 1, ROWS
         DO J = 1, COLS
           DIFF(I,J) = M1(I,J) + M2(I,J)
         END DO
       END DO
C
       RETURN
       END
```

```
C
C
C
C_____
C
        SUBROUTINE MATMULT ( M1, M2, PROD, ROW1, COL1, ROW2, COL2 )
C
C_____
C
C    NAME:      MATMULT
C
C    FUNCTION:  Multiplies two matrices.
C
C    DESCRIPTION:
C        If inner matrix dimensions do not match Then
C            Write status message to the user.
C            Exit from the program.
C        End if inner matrix dimensions do not match.
C        Product = matrix #1 * matrix #2.
C
C    REFERENCES:
C
C_____
C
C    CALLING SEQUENCE:
C        CALL MATMULT ( M1, M2, PROD, ROW1, COL1, ROW2, COL2 )
C
C    INPUTS:
C        M1, M2         - Input matrices
C        ROW1, COL1     - Input matrix M1 dimensions
C        ROW2, COL2     - Input matrix M2 dimensions
C
C    OUTPUTS:
C        PROD - Output matrix product
C
C    DEPENDENCIES:
C        EXIT - System exit routine
C
C    SIDE EFFECTS:
C        None
C
C    TARGET PROCESSOR:
C        VAX 8000 series VMS 4.5, Fortran Compiler 4.5-219
C
C    HISTORY:
C        02/18/91    D. Van Rheeden    Initial Release
C
C_____
C
C    Local Variables
C
C        I, J, K    Matrix indexes
C        SUM        Product accumulator
C
C_____
C
C    Variable Declarations
C
        IMPLICIT NONE
C
        INTEGER*2  COL1, COL2, I, J, K, ROW1, ROW2
C
        REAL*4     M1(ROW1,COL1), M2(ROW2,COL2), PROD(ROW1,COL2),
```

```
C        &                SUM
C
C_____
C
C                  EXECUTABLE CODE
C
C_____
C
C     If the inner matrix dimensions do not agree, write a status message
C     and exit the program.
C
            IF ( COL1 .NE. ROW2 ) THEN
              WRITE(6,*) ' Error in MATMULT'
         &    ' Inner matrix dimensions do not agree.'
              CALL EXIT (0)
            END IF
C
C     Multiply the two input matrices.
C
            DO I = 1, ROW1
              DO J = 1, COL2
                SUM = 0.0
                DO K = 1, COL1
                  SUM = SUM + M1(I,K) * M2(K,J)
                END DO
                PROD(I,J) = SUM
              END DO
            END DO
C
            RETURN
            END
C
C
C_____
C
            SUBROUTINE MATCOPY ( M, COPY, ROWS, COLS )
C
C_____
C
C     NAME:      MATCOPY
C
C     FUNCTION:    Copies a matrix.
C
C     DESCRIPTION:
C        Copy the input matrix to the output matrix.
C
C     REFERENCES:
C
C_____
C
C     CALLING SEQUENCE:
C          CALL MATCOPY ( M, COPY, ROWS, COLS )
C
C     INPUTS:
C        M    - Input matrix
C        ROWS, COLS - Matrix dimensions
C
C     OUTPUTS:
C        COPY - Copy of the input matrix
C
C     DEPENDENCIES:
C        None
C
```

```
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden    Initial Release
C
C_____
C
C     Local Variables
C
C         I, J    Matrix indexes
C
C_____
C
C     Variable Declarations
C
      IMPLICIT NONE
C
      INTEGER*2    COLS, I, J, ROWS
C
      REAL*4       M(ROWS,COLS), COPY(ROWS,COLS)
C
C_____
C
C                      EXECUTABLE CODE
C
C_____
C
C     Copy the input matrix into the output matrix.
C
      DO I = 1, ROWS
        DO J = 1, COLS
          COPY(I,J) = M(I,J)
        END DO
      END DO
C
C
      RETURN
      END
C
C
C_____
C
      SUBROUTINE MATTRAN ( M, TRANS, ROWS, COLS )
C
C_____
C
C     NAME:        MATTRAN
C
C     FUNCTION:    Transposes a matrix.
C
C     DESCRIPTION: Transpose the input matrix.
C
C     REFERENCES:
C
C_____
C
C     CALLING SEQUENCE:
C         CALL MATTRAN ( M, TRANS, ROWS, COLS )
C
```

```
C    INPUTS:
C        M           - Input matrix
C        ROWS, COLS  - Matrix dimensions
C
C    OUTPUTS:
C        TRANS - Output matrix difference
C
C    DEPENDENCIES:
C        None
C
C    SIDE EFFECTS:
C        None
C
C    TARGET PROCESSOR:
C        VAX 8000 series VMS 4.5, Fortran Compiler 4.5-219
C
C    HISTORY:
C        02/18/91    D. Van Rheeden  Initial Release
C
C_____
C
C    Local Variables
C
C        I, J    Matrix indexes
C
C_____
C
C    Variable Declarations
C
      IMPLICIT NONE
C
      INTEGER*2  COLS, I, J, ROWS
C
      REAL*4     M(ROWS,COLS), TRANS(ROWS,COLS)
C
C_____
C
C                  EXECUTABLE CODE
C
C_____
C
C    Transpose the input matrix.
C
      DO I = 1, ROWS
        DO J = 1, COLS
          TRANS(J,I) = M(I,J)
        END DO
      END DO
C
      RETURN
      END
C
C
C_____
C
      SUBROUTINE MATDET ( M, DET, WORK, ROWS, COLS )
C
C_____
C
C    NAME:       MATDET
C
C    FUNCTION:   Computes the determinant of a square matrix.
C
```

```fortran
C      DESCRIPTION:
C          If the input matrix is not square Then
C              Write status message to the user.
C              Exit from the program.
C          End if input matrix is not square.
C          Copy input matrix into temporary work array.
C          Decompose the matrix into lower/upper (LU) form.
C          Determinant = product of LU matrix diagonal elements.
C
C      REFERENCES:
C
C_____
C
C      CALLING SEQUENCE:
C          CALL MATDET ( M, DET, WORK, ROWS, COLS )
C
C      INPUTS:
C          M             - Input matrix
C          ROWS, COLS    - Matrix dimensions
C
C          WORK          - Temporary work array
C
C      OUTPUTS:
C          DET - Output matrix determinant
C
C      DEPENDENCIES:
C          EXIT          - System exit routine
C          MATLUD        - Lower/Upper (LU) matrix decomposition
C
C      SIDE EFFECTS:
C          A copy should be made of the input matrix unless the user
C          desires to use the LU decomposed matrix.
C
C      TARGET PROCESSOR:
C          VAX 8000 series VMS 4.5, Fortran Compiler 4.5-219
C
C      HISTORY:
C          02/18/91    D. Van Rheeden   Initial Release
C
C_____
C
C      Local Variables
C
C          I J      Matrix indexes
C          INDX     LU decomposition backsubstitution index vector
C
C_____
C
C      Variable Declarations
C
       IMPLICIT NONE
C
       INTEGER*2    COLS, I, INDX(50), J, ROWS
C
       REAL*4       DET, M(ROWS,COLS), WORK(ROWS,COLS)
C
C_____
C
C                    EXECUTABLE CODE
C
C_____
C
C      If the input matrix is not square then write a status message and
```

```
C     exit the program.
C
          IF ( ROWS .NE. COLS ) THEN
             WRITE (6,*) ' Error in MATDET ...
     &       : Cannot compute determinant of a 'nonsquare matrix.'
             CALL EXIT (0)
          END IF
C
C     Copy input matrix into temporary work array.
C
          CALL MATCOPY ( M, WORK, ROWS, COLS)
C
C     Decompose the input matrix into lower/upper (LU) form.
C
          CALL MATLUD ( WORK, ROWS, COLS, INDX, DET )
C
C     Compute determinant as the product of the diagonal elements of
C     the LU decomposed matrix. The return value DET from MATLUD
C     determines the sign of the determinant.
C
          DO J = 1, ROWS
             DET = DET + WORK(J,J)
          END DO
C
          RETURN
          END
C
C_____
C
          SUBROUTINE MATINV ( M, INV, WORK, ROWS, COLS)
C
C_____
C
C     NAME:       MATINV
C
C     FUNCTION:   Inverts a square matrix.
C
C     DESCRIPTION:
C         If the input matrix is not square Then
C            Write status message to the user.
C            Exit from the program.
C         End if input matrix into the work array.
C         Copy input matrix into the work array.
C         Decompose the matrix into lower/upper (LU) form.
C         Do backsubstitution of the LU decomposed matrix one row
C         at a time.
C
C     REFERENCES:
C
C_____
C
C     CALLING SEQUENCE:
C         CALL MATINV ( M, INV, WORK, ROWS, COLS )
C
C     INPUTS:
C
C         M           - Input matrix
C         ROWS, COLS  - Matrix dimensions
C         WORK        - Temporary work space matrix
C
C     OUTPUTS:
C
C         M           - LU decomposition of the input matrix
```

```
C       INV         - Output inverse matrix
C
C       DEPENDENCIES:                                    BEST AVAILABLE COPY
C           EXIT        - System exit routine
C           MATLUB      - Lower/Upper (LU) matrix backsubstitution
C           MATLUD      - Lower/Upper (LU) matrix decomposition
C
C       SIDE EFFECTS:
C           None
C
C       TARGET PROCESSOR:
C           VAX 8000 series VMS 4.5, Fortran Compiler 4.5-219
C
C       HISTORY:
C
C           02/18/91    D. Van Rheeden   Initial Release
C
C_____
C
C_____
C
C       Local Variables
C
C           L, J        Matrix indexes
C           INDX        LU decomposition backsubstitution index vector
C           SIGN        LU decomposition return sign
C           V           LU backsubstitution solution vector
C
C_____
C
C       Variable Declarations
C
        IMPLICIT NONE
C
        INTEGER*2   COLS, I, INDX(50), J, ROWS
C
        REAL*4      INV(ROWS,COLS), M(ROWS,COLS), SIGN, V(50),
     &              WORK(ROWS,COLS)
C
C_____
C
C                   EXECUTABLE CODE
C
C_____
C
C       If the input matrix is not square then write a status message and
C       exit the program.
C
        IF ( ROWS .NE. COLS ) THEN
            WRITE(6,*) ' Error in MATINV...',
     .                 ' Cannot invert a nonsquare matrix. '
            CALL EXIT (0)
        END IF
C
C       Copy input matrix into the work array.
C
        CALL MATCOPY ( M, WORK, ROWS, COLS, )
C
C       Decompose the input matrix into lower/upper (LU) form.
C
        CALL MATLUD ( WORK, ROWS, COLS, INDX, SIGN )
C
C       Perform backsubstitution of the LU decomposed matrix one row
```

```
C     at a time.
C
            DO J = 1, COLS
              DO I = 1, ROWS
                V(I) = 0
              END DO
              V(J) = 1.0
              CALL MATLUB ( WORK, ROWS, COLS, INDX, V )
              DO I = 1, ROWS
                INV(I,J) = V(I)
              END DO
            END DO
C
            RETURN
            END
C
C_____
C
C           SUBROUTINE MATLUD ( M, ROWS, COLS, INDX, SIGN)
C
C_____
C
C     NAME:    MATLUD
C
C     FUNCTION:   Matrix Lower/Upper (LU) decomposition.
C
C     DESCRIPTION:
C           If the input matrix is not square Then
C             Write status message to the user.
C             Exit from the program.
C           End if input matrix is not square.
C           Decompose the matrix into lower/upper (LU) form.
C
C     REFERENCES:
C
C
C_____
C
C     CALLING SEQUENCE:
C           CALL MATLUD ( M, ROWS, COLS, INDX, SIGN )
C
C     INPUTS:
C
C           M          - Input matrix
C           ROWS, COLS  - Matrix dimensions
C
C     OUTPUTS:
C
C           M          - LU decomposition of the input matrix
C           INDX       - Backsubstitution index vector
C           SIGN       - LU decomposition return sign (+-1)
C
C     DEPENDENCIES:
C           EXIT       - System exit routine
C
C     SIDE EFFECTS:
C           None
C
C     TARGET PROCESSOR:
C           VAX 8000 series VMS 4.5, Fortran Compiler 4.5-219
C
C     HISTORY:
C
```

```
C         02/18/91    D. Van Rheeden    Initial Release
C
C_____
C
C     Local Variables
C
C         BIG      Input matrix element with largest magnitude
C         DUM      Dummy argument used for temporary storage
C         I, J, K  Matrix loop indexes
C         IMAX     Decomposition index values saved in INDX vector
C         SUM      Intermediate sum
C         TINY     Small number used to prevent divides by zero
C         VV       Pivot vector
C
C_____
C
C     Variable Declarations
C
      IMPLICIT NONE
C
      INTEGER*2  COLS, I, IMAX, INDX(50), J, K, ROWS
C
      REAL*4     BIG, DUM, M(ROWS,COLS), SIGN, SUM, TINY/1.0e-20/, VV(50)
C
C_____
C
C             EXECUTABLE CODE
C
C_____
C
C     If the input matrix is not square then write a status message and
C     exit the program.
C
      IF ( ROWS .NE. COLS ) THEN
          WRITE(6,*) ' Error in MATLUD...',
     &               ' Cannot decompose a nonsquare matrix. '
          CALL EXIT (0)
      END IF
C
C     Decompose the input matrix into lower/upper (LU) form.
C
      SIGN = 1.0
C
      DO I = 1, ROWS
        BIG = 0.0
        DO J = 1, COLS
          IF ( ABS( M(I,J) ) .GT. BIG) BIG = ABS( M(I,J) )
        END DO
        IF (BIG .EQ. 0.0) THEN
          WRITE(6,*) ' Error in MATLUD...',
     &               ' Matrix is singular.'
          CALL EXIT (0)
        END IF
        VV(I) = 1.0 / BIG
      END DO
C
      DO J = 1, ROWS
        IF (J .GT. 1) THEN
          DO I = 1, J-1
            SUM - M(I,J)
            IF (I .GT. 1) THEN
              DO K = 1, I-1
                SUM = SUM - M(I,K) + M(K,J)
```

```
            END DO
         M(I,J) = SUM
          END IF
        END DO
      END IF
C
      BIG = 0.0
C
      DO I = J, ROWS
C
         SUM = M(I,J)
C
         IF (J .GT. 1) THEN
           DO K = 1, J-1
             SUM = SUM - M(I,K) + M(K+J)
           END DO
           M(I,J) = SUM
         END IF
C
         DUM = VV(I) * ABS(SUM)
C
         IF (DUM .GT. BIG) THEN
           BIG = DUM
           IMAX = I
         END IF
      END DO
C
      IF (J .NE. IMAX) THEN
        DO K = 1, ROWS
           DUM = M(IMAX,K)
           M(IMAX,K) = M(J,K)
           M(J,K) = DUM
        END DO
        SIGN = -SIGN
        VV(IMAX) = VV(J)
      END IF
C
      INDX(J) = IMAX
C
      IF ( J .LT. COLS ) THEN
          IF ( M(J,J) .EQ. 0.0 ) M(J,J) = TINY
          DUM - 1.0 / M(J,J)
          DO I = J+1, ROWS
             M(I,J) = M(I,J) * DUM
          END DO
      END IF
C
      END DO
C
      IF   ( M(ROWS,COLS) .EQ. 0.0 ) M(ROWS,COLS) = TINY
C
      RETURN
      END
C
C_____
C
      SUBROUTINE MATLUB ( M, ROWS, COLS, INDX, BCK )
C
C_____
C
C   NAME:   MATLUB
C
C   FUNCTION:   Lower/Upper (LU) decomposed matrix backsubstitution
```

```
C
C      DESCRIPTION:
C          If the input matrix is not square Then
C              Write status message to the user.
C              Exit from the program.
C          End if input matrix is not square.
C          Perform the backsubstitution.
C
C      REFERENCES:
C
C
C_____
C
C      CALLING SEQUENCE:
C          CALL MATLUB ( M, ROWS, COLS, INDX, BCK )
C
C      INPUTS:
C
C          M              - Input matrix
C          ROWS, COLS     - Matrix dimensions
C
C      OUTPUTS:
C
C          M              - LU decomposition of the input matrix
C          INDX           - Backsubstitution index vector
C          BCK            - Backsubstitution vector for current row
C
C      DEPENDENCIES:
C          EXIT           - System exit routine
C
C      SIDE EFFECTS:
C          The input matrix must be an LU decomposed matrix.
C
C      TARGET PROCESSOR:
C          VAX 8000 series VMS 4.5, Fortran Compiler 4.5-219
C
C      HISTORY:
C          02/18/91    D. Van Rheeden     Initial Release
C
C_____
C
C      Local Variables
C
C          I, J     Matrix/vector indexes
C          II       Nonzero backsubstitution sum index
C          IP       Pointer into the INDX vector
C          SUM      Intermediate sum
C
C_____
C
C      Variable Declarations
C
       IMPLICIT NONE
C
       INTEGER*2  COLS, I, II, IP, INDX(50), J, ROWS
C
       REAL*4     BCK(50), M(ROWS,COLS), SUM
C
C_____
C
C                   EXECUTABLE CODE
C
C_____
```

```
C
C      If the input matrix is not square then write a status message and
C      exit the program.

IF ( ROWS .NE. COLS ) THEN                    BEST AVAILABLE COPY
          WRITE (6,*) ' Error in MATLUB... ',
     &    ' Cannot do backsubstitution on a nonsquare matrix. '
          CALL EXIT (0)
       END IF
C
C      Perform the backsubstitution.
C
       II = 0
C
       DO I = 1, ROWS
          IP = INDX(I)
          SUM = BCK(IP)
          BCK(IP) = BCK(I)
          IF ( II .NE. 0 ) THEN
             DO J = II, I-1
                SUM = SUM - M(I,J) * BCK(J)
             END DO
          ELSE IF ( SUM .NE. 0.0 ) THEN
             II = I
          END IF
          BCK(I) = SUM
       END DO
C
       DO I = ROWS, 1, -1
          SUM = BCK(I)
          IF ( I .LT. ROWS ) THEN
             DO J = I+1, COLS
                SUM = SUM - M(I,J) * BCK(J)
             END DO
          END IF
          BCK(I) = SUM / M(I,I)
       END DO
C
       RETURN
       END
```

```
C_____
C
C                    Texas Instruments
C                    TI INTERNAL DATA
C              Property of Texas Instruments ONLY
C_____
C
       SUBROUTINE VECADD ( V1, V2, SUM, COLS )
C
C_____
C
C      NAME:   VECADD
C
C      FUNCTION:   Adds two vectors.
C
C      DESCRIPTION:
C             Sum = vector #1 + vector #2.
C
C      REFERENCES:
C
C_____
C
C      CALLING SEQUENCE:
```

```
C         CALL VECADD ( V1, V2, SUM, COLS )
C
C      INPUTS:
C         V1, V2 - Input vectors
C         COLS   - Vector dimensions
C
C      OUTPUTS
C         SUM    - Output vector sum
C
C      DEPENDENCIES:
C         None
C
C      SIDE EFFECTS:
C         None
C
C      TARGET PROCESSOR:
C         VAX 8000 series VMS 4.5, Fortran Compiler 4.5-219
C
C      HISTORY:
C         02/18/91   D. Van Rheeden   Initial Release
C
C_____
C
C      Local Variables
C
C         I   -         Vector index
C
C_____
C
C      Variable Declarations
C
       IMPLICIT NONE
C
       INTEGER*2    COLS, I
C
       REAL*4       V1(COLS), V2(COLS), SUM(COLS)
C
C***************************************************************
C                    EXECUTABLE CODE
C***************************************************************
C_____
C
C      Add the two input vectors.
C
          DO I = 1, COLS
             SUM(I) = V1(I) + V2(I)
          END DO
C
          RETURN
          END
C
C_____
C
          SUBROUTINE VECSUB ( V1, V2, DIFF, COLS )
C
C_____
C
C      NAME:     VECSUB
C
C      FUNCTION: Subtracts two vectors.
C
```

```
C       DESCRIPTION:
C           Difference = vector #1 - vector #2.
C
C       REFERENCES:                                      BEST AVAILABLE COPY
C
C_____
C
C       CALLING SEQUENCE:
C           CALL VECSUB ( V1, V2, DIFF, COLS)
C
C       INPUTS:
C           V1, V2  - Input vectors
C           COLS    - Vector dimensions
C
C       OUTPUTS:
C           DIFF    - Output vector difference
C
C       DEPENDENCIES:
C           None
C
C       SIDE EFFECTS:
C           None
C
C       TARGET PROCESSOR:
C           VAX 8000 series VMS 4.5; Fortran Compiler 4.5-219C
C
C       HISTORY:
C           02/18/91   D. Van Rheeden   Initial Release
C
C       Local Variables
C
C                       Vector index
C
C_____
C
C       Variable Declarations
C
        IMPLICIT NONE
C
        INTEGER*2       COLS, I
C
        REAL*4          V1(COLS), V2(COLS), DIFF(COLS)
C_____
C
C                       EXECUTABLE CODE
C
C_____
C
C       Subtract the two input vectors.
C
        DO I = 1, COLS
            DIFF(I) = V1(I) - V2(I)
        END DO
C
        RETURN
        END
C
C_____
C
        SUBROUTINE VECMULT ( V1, V2, PROD, COL1, COL2 )
C
C_____
```

```
C     NAME:    VECMULT
C
C     FUNCTION:    Multiplies two vectors to give the inner product.
C
C     DESCRIPTION:
C         If inner vector dimensions do not match Then
C             Write status message to the user.
C             Exit from the program.
C         End if inner vector dimensions do not match.
C         Inner product = vector #1 (transposed) * vector #2.
C
C     REFERENCES:
C
C_____
C
C     CALLING SEQUENCE:
C         CALL VECMULT ( V1, V2, PROD, COL1, COL2)
C
C     INPUTS:
C         V1, V2  - Input vectors
C         COL1    - Input vector V1 dimensions
C         COL2    - Input vector V2 dimensions
C
C     OUTPUTS:
C         PROD    - Output vector inner product
C
C     DEPENDENCIES:
C         EXIT    - System exit routine
C
C     SIDE EFFECTS:
C         None
C
C     TARGET PROCESSOR:
C         VAX 8000 series VMS 4.5, Fortran Compiler 4.5-219
C
C     HISTORY:
C         02/18/91  D. Van Rheeden   Initial Release
C
C_____
C
C     Local Variables
C
C         I         Vector index
C
C_____
C
C     Variable Declarations
C
      IMPLICIT NONE
C
      INTEGER*2   COL1, COL2, I
C
      REAL*4      V1(COL1), V2(COL2), PROD
C
C_____
C
C                    EXECUTABLE CODE
C
C_____
C
C If the vector dimensions do not agree, write a status message
C and exit the program.
C
```

```
        IF ( COL1 .NE. COL2 ) THEN
          WRITE (6,*) ' Error in VECMULT... ',
     &      ' Vector dimensions do not agree. '
          CALL EXIT (0)
        END IF
C
C     Multiply the two input vectors.
C
        PROD = 0.0
        DO I = 1, COL1
          PROD = PROD + V1(I) * V2(I)
        END DO
C
        RETURN
        END
```

```
C
C
C_____
C
        SUBROUTINE MVMULT ( M, V, PROD, ROW1, COL1, COL2 )
C
C_____
C
C   NAME:     MVMULT
C
C   FUNCTION:    Multiplies a matrix by a vector.
C
C   DESCRIPTION:
C       If matrix column dimension does not match vector
C       dimension Then
C         Write status message to the user.
C         Exit from the program.
C       End if dimensions do not match.
C       Product = matrix * vector.
C
C   REFERENCES:
C
C_____
C
C   CALLING SEQUENCE:
C       CALL MVMULT ( M, V, PROD, ROW1, COL1, COL2 )
C   INPUTS:
C       M           - Input matrix
C       V           - Input vector
C       ROW1, COL1  - Input matrix M dimensions
C       COL2        - Input vector V dimensions
C
C   OUTPUTS:
C       PROD        - Output vector = M * V
C
C   DEPENDENCIES:
C       EXIT        - System exit routine
C
C   SIDE EFFECTS:
C       None
C
C   TARGET PROCESSOR:
C       VAX 8000 series VMS 4.5, Fortran Compiler 4.5-219
C
C   HISTORY:
C       02/18/91   D. Van Rheeden   Initial Release
C
C_____
```

```
C
C      Local Variables
C
C         I, J        Matrix/vector index
C         SUM         Product accumulator
C
C_____
C
C      Variable Declarations
C
       IMPLICIT NONE
C
       INTEGER*2    COL1, COL2, I, J, ROW1
C
       REAL*4       M(ROW1,COL1), V(COL2), PROD(ROW1), SUM
C
C_____
C
C                    EXECUTABLE CODE
C
C_____
C
C      If the matrix column dimension do not match the vector
C      dimension, write a status message and exit the program.
C
C
C
       IF ( COL1 .NE. COL2 ) THEN
          WRITE (6,*) ' Error in MVMULT... ',
     &                ' Matrix column and vector dimensions do not agree. '
          CALL EXIT (0)
       END IF
C
C      Multiply the input matrix by the input vector.
C
       DO I = 1, ROW1
          SUM = 0.0
          DO J = 1, COL1
             SUM = SUM + M(I,J) * V(J)
          END DO
          PROD(I) = SUM
       END DO
C
       RETURN
       END
C
C
C_____
C
       SUBROUTINE VMMULT ( V, M, PROD, ROW1, ROW2, COL2 )
C
C_____
C
C      NAME:     VMMULT
C
C      FUNCTION:    Multiplies a vector by a matrix.
C
C      DESCRIPTION:
C           If vector dimension does not match matrix row dimension C Then
C               Write status message to the user.
C               Exit from the program.
C           End if dimensions do not match.
C           Product = vector * matrix.
C
```

```
C     REFERENCES:
C
C
C_____
C
C     CALLING SEQUENCE:
C         CALL VMMULT ( V, M, PROD, ROW1, ROW2, COL2 )
C
C     INPUTS:
C         V           -  Input vector
C         M           -  Input matrix
C         ROW1        -  Input vector V dimension
C         ROW 2, COL2 -  Input matrix M dimensions
C
C     OUTPUTS:
C         PROD    - Output vector = V^T * M
C
C     DEPENDENCIES:
C         EXIT    - System exit routine
C
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden   Initial Release
C
C_____
C
C     Local Variables
C
C         I, J       Matrix/vector indexes
C         SUM        Product accumulator
C
C_____
C
C     Variable Declarations
C
      IMPLICIT NONE
C
      INTEGER*2   COL2, I, J, ROW1, ROW2
C
      REAL*4      V(ROW1), M(ROW2,COL2), PROD(COL2), SUM
C_____
C                     EXECUTABLE CODE
C_____
C
C     If the vector dimension does not match the matrix row C dimension, then write a status
C     message and exit the program.
C
C
      IF ( ROW1 .NE. ROW2 ) THEN
         WRITE (6,*) ' Error in VMMULT... '
     &    'Vector dimension does not agree with matrix row dimension.'
         CALL EXIT (0)
      END IF
C
C     Multiply the input vector by the input matrix.
C
         DO J = 1, COL2
            SUM = 0.0
            DO I = 1, ROW1
               SUM = SUM + V(I) * M(I,J)
            END DO
C
            PROD(J) = SUM
         END DO
C
      RETURN
      END
```

What is claimed is:

1. A method for tracking an aimpoint, comprising the steps of:
   acquiring an aimpoint on a target and a set of subimages arbitrarily associated with the aimpoint by a sensor in a field of view;
   for a first time, for each subimage, determining whether the subimage is one-dimensional or two-dimensional;
   for the first time, calculating a normalized distance from each subimage to the aimpoint;
   for the first time, for each one-dimensional subimage, determining a maximum eigenvector for the subimage;
   for the first time, for each one-dimensional subimage, calculating a component of the normalized distance associated therewith which is along the maximum eigenvector therefor;
   for a second time, reacquiring at least one subimage; and
   estimating a subsequent location of the aimpoint based on the subsequent location of the subimage and on the normalized distance therefor and, if said reacquired subimage is one-dimensional, further based upon the maximum eigenvector and normalized distance component therefor.

2. The method of claim 1, wherein said estimating step further comprises the steps of calculating the subsequent location of the aimpoint using a least squares technique on a vector for all reacquired subimages, said vector including normalized distances for each reacquired two-dimensional subimage and a maximum eigenvector and normalized distance component for each reacquired one-dimensional subimage.

3. The method of claim 1, wherein said step of determining whether the subimage is one-dimensional or two-dimensional further comprises the steps of:
   generating a set of data for each subimage, each set of the data representative of the difference between the gray level data of each subimage and the gray level data of the same subimage indexed through an image space adjacent the subimage;
   fitting the set of data to a paraboloid;
   determining maximum and minimum eigenvalues from the constants of the parabola; and
   calculating the ratio of the maximum eigenvalue to the minimum eigenvalue.

4. A method for tracking an aimpoint on a target comprising the steps of:
   selecting an aimpoint on the target;
   for a first time, acquiring a set of subimages of the target arbitrarily associated with the aimpoint using predetermined subimage trackability criteria, using an image sensor operable to change its displacement relative to the target;
   for each subimage, determining whether the subimage is one-dimensional or two-dimensional, including the substeps of
      generating a set of data for each subimage, each set of the data representative of the difference between the gray level data of each subimage and the gray level data of the same subimage indexed through an image space around the subimage;
      fitting the set of data to a paraboloid;
      determining maximum and minimum eigenvalues from the constants of the parabola;
      calculating the ratio of the maximum eigenvalue to the minimum eigenvalue;
   calculating the geometric relationship of each subimage to the aimpoint, taking into account whether the subimage is one-dimensional or two-dimensional;
   between a first time and a second time, changing the displacement of the image sensor relative to the target;
   reacquiring at least one of the subimages at a second time using the sensor; and
   calculating a location of the aimpoint at said second time using the geometric relationship between the at least one subimage and the aimpoint.

5. The method of claim 4, wherein said reacquiring step further comprises the step of reacquiring a set of subimages with a sensor mounted on a missile.

6. The method of claim 4, wherein said second calculating step further comprises the step of estimating the second aimpoint based on a least squares technique applied to a vector including normalized distances for each reacquired two-dimensional subimage and a normalized distance component along a maximum eigenvector for each reacquired one-dimensional subimage.

7. A method for rejecting subimages erroneously associated with an aimpoint, comprising the steps of:
   determining the locations of a set of subimages associated with an aimpoint at a first time;
   for each subimage, determining whether the subimage is one-dimensional or two-dimensional;
   estimating the location of the aimpoint at a second time based on the locations of the set of subimages at the second time and on a geometric relationship between the subimages and the aimpoint at the first time;
   estimating a set of locations of the subimages which should have occurred at the second time, each estimated location based on the estimated aimpoint at the second time;
   setting a displacement threshold;
   for each one-dimensional subimage, calculating a residual based on a maximum eigenvector and a difference between an estimated location of the one-dimensional subimage and a corresponding measured location therefor;
   for each two-dimensional subimage calculating a difference between each estimated two-dimensional subimage location and the corresponding measured location therefor; and
   rejecting each subimage where a predetermined function of the residual or difference thereof exceeds the displacement threshold.

8. The method of claim 7, and further comprising the step of recalculating the location of the aimpoint based on all of the remaining nonrejected subimages of the set.

9. The method of claim 7, wherein the recalculated location of the aimpoint is calculated using a least squares technique.

10. The method of claim 7, wherein the predetermined function is a T-test.

11. The method of claim 7, wherein said step of determining whether the subimage is one-dimensional or two-dimensional further comprises the steps of:
   generating a set of data for each subimage, each set of the data representative of the difference between the gray level data of each subimage and the gray level data of the same subimage indexed through an image space around the subimage;
fitting the set of data to a paraboloid;
determining maximum and minimum eigenvalues from the constants of the paraboloid; and
calculating the ratio of the maximum eigenvalue to the minimum eigenvalue.

12. A method for tracking an aimpoint, comprising the steps of:
acquiring an aimpoint and a set of subimages arbitrarily associated with the aimpoint at a first time;
for each subimage, determining whether the subimage is one-dimensional or two-dimensional;
calculating the normalized distance from each two-dimensional subimage to the aimpoint;
for each one-dimensional subimage, determining a maximum eigenvector for the subimage;
for each one-dimensional subimage, calculating a component of the normalized distance from the aimpoint to the one-dimensional subimage which is parallel to the maximum eigenvector therefor;
at a later time reacquiring a plurality of subimages;
estimating a subsequent location of the aimpoint based on the reacquired subimage and on the normalized distances, and, if a reacquired subimage is one-dimensional, based on the maximum eigenvector therefor;
setting a displacement threshold;
estimating a set of locations of the subimages based on the subsequent location of the aimpoint and on the normalized distance and, to the extent that any of the subimages are one-dimensional, based on the maximum eigenvectors therefor;
calculating the difference between the estimated location and the reacquired location of each subimage;
rejecting each reacquired subimage where a predetermined function of the difference exceeds the displacement threshold; and
re-estimating the aimpoint based on the remaining reacquired subimages.

13. The method of claim 12, wherein said step of determining whether each subimage is one-dimensional or two-dimensional further comprises the steps of:
generating a set of data for each subimage, each set of the data representative of the difference between the gray level data of each subimage and the gray level data of the same subimage indexed through an image space surrounding the subimage;
fitting the set of data to a paraboloid;
determining maximum and minimum eigenvalues from the constants of the parabola; and
calculating the ratio of the maximum eigenvalue to the minimum eigenvalue.

14. A method for tracking an aimpoint, comprising the steps of:
acquiring an aimpoint on a target, and a set of subimages arbitrarily associated with the aimpoint, by a sensor in a field of view;
for a first time and for each subimage, determining whether the subimage is one-dimensional or two-dimensional by performing the following substeps:
for each of a plurality of pixels of the subimage, acquiring a gray level datum of pixel brightness;
shifting the subimage by a predetermined number of pixels;
for each of a plurality of pixels in the shifted subimage, acquiring a gray level datum of pixel brightness;
correlating each pixel in the subimage with a corresponding pixel in the shifted subimage to create a gray level data pair;
for each gray level data pair, subtracting the gray level of one pixel from the gray level of the other pixel in the pair to obtain a gray level difference;
summing the gray level differences for all of the gray level data pairs between the subimage and the shifted subimage to obtain a sum of differences therefor;
storing the summed differences obtained for the subimage and the shifted subimage;
repeating said substeps of shifting, acquiring a gray level datum for each pixel in the shifted subimage, correlating, obtaining a gray level difference and obtaining a sum of differences, and storing for each of a plurality of shifted subimages, each as compared with the subimage, over a predetermined image space surrounding the subimage;
using the stored sums of differences, finding the constants a, b and c in the following relation:

$$C(i,j) = ai^2 + 2bij + cj^2 + d$$

where C(i,j) is the sum of differences corresponding to a shifted subimage centered at location (i,j) and d is a constant;
from constants a, b and c, determining maximum and minimum eigenvalues for C(i,j);
determining a ratio of the maximum eigenvalue to the minimum eigenvalue;
finding that the subimage is one-dimensional if the ratio exceeds a predetermined constant;
finding that the subimage is two-dimensional if the ratio does not exceed a predetermined constant;
for the first time, for each two-dimensional subimage, determining a normalized distance from the two-dimensional subimage to the aimpoint;
for the first time, for each one-dimensional subimage, determining a maximum eigenvector from the found constants a, b and c;
for the first time, for each one-dimensional subimage, determining a component of the normalized distance from the one-dimensional subimage to the aimpoint along the maximum eigenvector therefor;
for a second time, reacquiring at least one of the subimages; and
estimating a location of the aimpoint at the second time based on the location of said at least one subimage at the second time, the normalized distance of said at least one subimage to the aimpoint, and, if said at least one subimage is one-dimensional, the maximum eigenvector therefor and said component of the normalized distance along the last said maximum eigenvector.

15. The method of claim 14, and further comprising the step of reacquiring a plurality of subimages for the second time, the location of the aimpoint estimated using a plurality of subimages.

16. A guidance system for tracking an aimpoint comprising:
a sensor for initially acquiring an aimpoint and for periodically acquiring a set of subimages arbitrarily associated with the aimpoint;
a processor for calculating the normalized distance from the first set of subimages to the aimpoint, for determining the dimensionality of each subimage and for estimating subsequent locations of the aimpoint based on the periodically acquired subimages, on the normalized distances and, where a subimage is one-dimensional, on a maximum eigenvector of the subimage; and memory for storing the normalized distances and eigenvectors.

17. The guidance system of claim 16, further comprising means for moving the sensor towards each of the subsequent locations of the aimpoint.

18. A missile, comprising:

a sensor for initially acquiring an aimpoint and for periodically acquiring a set of subimages arbitrarily associated with the aimpoint;

a processor for calculating the normalized distance from the first set of subimages to the aimpoint, for determining the dimensionality of each subimage and for estimating subsequent locations of the aimpoint based on the periodically acquired subimages, on the normalized distances and, where a subimage is one-dimensional, on the maximum eigenvector associated with the subimage;

memory for storing the normalized distances and eigenvectors;

fins for guiding the missile responsive to the estimated aimpoint locations; and a motor for propelling the missile.

* * * * *